United States Patent [19]

Hartung et al.

[11] Patent Number: 4,636,946
[45] Date of Patent: Jan. 13, 1987

[54] METHOD AND APPARATUS FOR GROUPING ASYNCHRONOUS RECORDING OPERATIONS

[75] Inventors: Michael H. Hartung; Gerald E. Tayler, County of Pima, both of Ariz.

[73] Assignee: International Business Machines Corporation, Armonk, N.Y.

[21] Appl. No.: 351,835

[22] Filed: Feb. 24, 1982

[51] Int. Cl.[4] .............................................. G06F 13/00
[52] U.S. Cl. .................................................... 364/200
[58] Field of Search ............................... 364/200, 900

[56] References Cited

U.S. PATENT DOCUMENTS

| | | |
|---|---|---|
| 3,956,737 | 5/1976 | Ball ..................... 340/172.5 |
| 4,084,231 | 4/1978 | Capozzi et al. ............. 364/200 |
| 4,263,650 | 4/1981 | Bennett et al. ............. 364/200 |
| 4,317,168 | 2/1982 | Messina .................. 364/200 |
| 4,349,871 | 9/1982 | Lary ..................... 364/200 |
| 4,403,288 | 9/1983 | Christian ................. 364/200 |
| 4,414,644 | 11/1983 | Tayler .................... 364/900 |
| 4,425,616 | 1/1984 | Woodell .................. 364/200 |
| 4,514,808 | 4/1985 | Murayama et al. .......... 364/200 |
| 4,530,053 | 7/1985 | Kirz et al. ................ 364/200 |

FOREIGN PATENT DOCUMENTS 2024476  1/1980  United Kingdom .

OTHER PUBLICATIONS

Mattson "Storage Management of Linear Lists by Ordinal Numbers", IBM Technical Disclosure Bulletin, vol. 19, No. 7, Dec. 1976.
K. Maruyama; "mLRU Page Replacement Algorithm in Terms of the Reference Matrix", IBM Technical Disclosure Bulletin, vol. 17, No. 10, pp. 3101–3103, Mar. 1975.
K. Maruyama; "mLRU Page Replacement Algorithm in Terms of Reference Counters"; IBM Technical Disclosure Bulletin, vol. 17, No. 10, pp. 3104–3106; Mar. 1975.

Primary Examiner—Gareth D. Shaw
Assistant Examiner—Christina M. Eakman
Attorney, Agent, or Firm—H. F. Somermeyer; James A. Pershon; George E. Clark

[57] ABSTRACT

The disclosure relates to demotion of data to a backing store (disk storage apparatus—DASD) from a random access cache in a peripheral data storage system. A cache replacement control list, such as a least recently used (LRU) list is scanned in a soon-to-be replaced first portion (portion closest to LRU entry) to identify first data to be demoted. Then the control list is scanned in first and second portions to identify further data to be demoted with the first data as a single group of data. In DASD, such data is all storable in the same cylinder of the DASD.

15 Claims, 12 Drawing Figures

METHOD AND APPARATUS FOR GROUPING ASYNCHRONOUS RECORDING OPERATIONS

FIELD OF THE INVENTION

The present invention relates to multilevel data storage hierarchies, more particularly to the control thereof with respect to transferring data from an upper to a data-storage level in such a hierarchy.

DISCUSSION OF THE PRIOR ART

Peripheral data storage hierarchies have been used for years for providing an apparent store as suggested by Eden, et al in U.S. Pat. No. 3,569,938. Eden, et al teach that, in a demand paging or request system, caching data into a high-speed storage (buffer) can make peripheral data storage systems appear to have a large capacity, yet provide rapid access to data storage areas; this rapid access is faster than that provided by the backing store. Eden, et al also teach that the backing store can provide retentive data storage, such as magnetic tape recorders and magnetic disk recorders, while the front store can be non-volatile, such as magnetic core memory. With the advances in memory technology, the front store is typically now made from semiconductive type memory elements, a volatile memory. U.S. Pat. No. 3,839,704 shows another form of a data storage hierarchy.

An important aspect of data storage hierarchies is enabling data integrity. That is, the data received from a user, such as a central processing unit (CPU), or other data handling device should be returned to the supplying unit either correct or with an indication that errors may exist. Accordingly, it is typical practice in data storage hierarchies to move data from a higher level to a lower level for retentive storage, as well as limiting the data in the higher levels such that other data can also be stored for rapid access. U.S. Pat. No. 4,020,466 shows copying changes from a high-level store to a backing store. U.S. Pat. No. 4,077,059 shows forcing copyback under predetermined conditions. Such copyback operations can consume data storage hierarchy performance capability; i.e., so much data may be copied back that access to the data by a using unit may be degraded. This problem is partially solved by U.S. Pat. No. 3,588,839 which teaches that the only data that need be copied back from a high-level storage unit to a low-level storage unit is that data that is altered, i.e. where there is noncongruence between data stored in a backing store and data stored in a front store.

Storage hierarchies have taken diverse forms. For example, in accordance with the Eden, et al U.S. Pat. No. 3,569,938, a single high-speed store serviced several users. U.S. Pat. No. 3,735,360 shows that each processor can have its own high-speed store or cache. Performance of the data storage hierarchies also is affected by the algorithms and other controls used to place predetermined data into the cache or high-speed storage portion. Accordingly, U.S. Pat. No. 3,898,624 shows that varying the time of fetching data from a backing store to a front or caching store can be selected by a computer operator in accordance with the programs being executed in a using CPU. In this manner, it is hoped that the data resident in the cache, or upper level of the hierarchy, will be that data needed by the CPU while data not needed is not resident in cache for allowing more useful data to be stored in the higher level storage portion. All of these operations become quite intricate. Accordingly, evaluation programs for storage hierarchies have been used to evaluate how best to manage a storage hierarchy. U.S. Pat. Nos. 3,964,028 and 4,068,304 show performance monitoring of storage hierarchies for achieving these goals. Even at that, much remains to be done in various types of data storage hierarchies for enhancing optimum performance while ensuring data integrity. Much of the work with respect to storage hierarchies has occurred in the cache and main memory combinations as connected to a using CPU. Principles and teachings of a cached main memory relate directly to caching and buffering peripheral systems as originally suggested by Eden, et al, supra, which relate to caching or buffering data outside of the host processor. Main memory has been used prior to Eden, et al for buffering or caching data from a magnetic tape and disk unit for a CPU, i.e., a main memory was not only used as a CPU working memory but also as a buffer for peripheral devices.

Some data storage systems store user data while others store so-called paging and swapping data, such as can be used in connection with paging and swapping program data sets. An example of such a paging store is the IBM 2305 Fixed Head Storage Module, which is described in publication GA26-1589-3 "Reference Manual for IBM 2835 Storage Control and IBM 2305 Fixed Head Storage Module", available from International Business Machines Corporation, Armonk, N.Y. This peripheral data storage system consists of a magnetic storage drum which provides rapid access to the stored data. Because of its limited storage capacity, larger hosts requiring larger capacities cannot always use the IBM 2305 paging store to its maximum efficiency; extra capacity is provided by disk-type direct-access storage devices (DASD). Such is particularly true when so-called swapping data sets are used, i.e., large sequential sets of data are rapidly transferred between a host and a peripheral memory. To alleviate storage capacity limitations, while not sacrificing performance criteria, a hierarchical store can be substituted for the 2305 storage drum.

In a data storage hierarchy with a random-access volatile front store and a DASD backing store, data transfers between the front store, also termed a cache, and DASD should be grouped; accordingly, a simple but effective data-transfer grouping mechanism is desired for reducing the time required for such data transfers without host intervention. In particular, it is desired to move data from cache to DASD before cache storage space is needed for storing other data. Moving modified data from cache to DASD before space is needed is shown in the IBM TECHNICAL DISCLOSURE BULLETIN, Volume 23, No. 12, May 1981, pages 5426 and 5427, in an article entitled "Preventive Cast-Out Operations in Cache Hierarchies." This article teaches scanning for altered data in an MRU (most recently used)-LRU (least recently used) list for the purpose of transferring a copy of altered data from a front store, or cache, to a backing store such that, when a replacement algorithm is invoked, that data need not be then transferred from the cache to the backing store. This prior art shows scanning an MRU-LRU list from the LRU end for transferring data from cache to DASD to make the replacement algorithm more efficient. It does not show batching or grouping related data to enable a block transfer of data.

SUMMARY OF THE INVENTION

It is an object of the invention to provide an efficient data grouping control for a data storage hierarchy.

In accordance with the invention, a cache (usually volatile) replacement overlay control list is maintained. Such a list is preferably based upon least-recent usage, although other criteria may be employed. During predetermined times, the cache replacement control list is scanned for finding modified data in the cache to be moved to a backing retentive store, preferably consisting of direct-access storage devices. The cache replacement control list has an availability threshold which is a predetermined percentage of all of the addressable storage slots, or areas, of the front store, or cache. Any modified slot on the cache replacement control list below the availability threshold, when scanned, results in a data transfer being initiated from the cache to the DASD. Before initiating such transfer, all data slots of the cache below a second and higher threshold, called a group or batch threshold, are scanned to identify all other data up to a predetermined limit in the cache that is modified and resides within the same access-delay boundaries of the backing store. In DASD, the delay boundaries are switching from one cylinder of tracks to another cylinder of tracks. The predetermined limit is also partially determined by the data transfer characteristics into and out of the cache. Once all of the related data blocks are identified, the data blocks are grouped into a single queue. Thereafter the data transfers are initiated.

In a secondary aspect of the invention, a discard list is maintained. The discard list is first examined for data blocks to be discarded. All of the blocks to be discarded are first discarded before initiating a write data transfer. In this manner, addressable storage areas of the cache are made available for allocation to data storage, or free, first upon that data which can be discarded, and then secondly upon data which may have to be recorded in the retentive, or backing, store.

The foregoing and other objects, features, and advantages of the invention will be apparent from the following more particular description of the preferred embodiments of the invention, as illustrated in the accompanying drawings.

DESCRIPTION OF THE DRAWINGS

FIG. 4 shows a practical implementation of the cache replacement control list when employing a least-recent usage cache replacement or overlay criterion.

DETAILED DESCRIPTION

Figure 1:
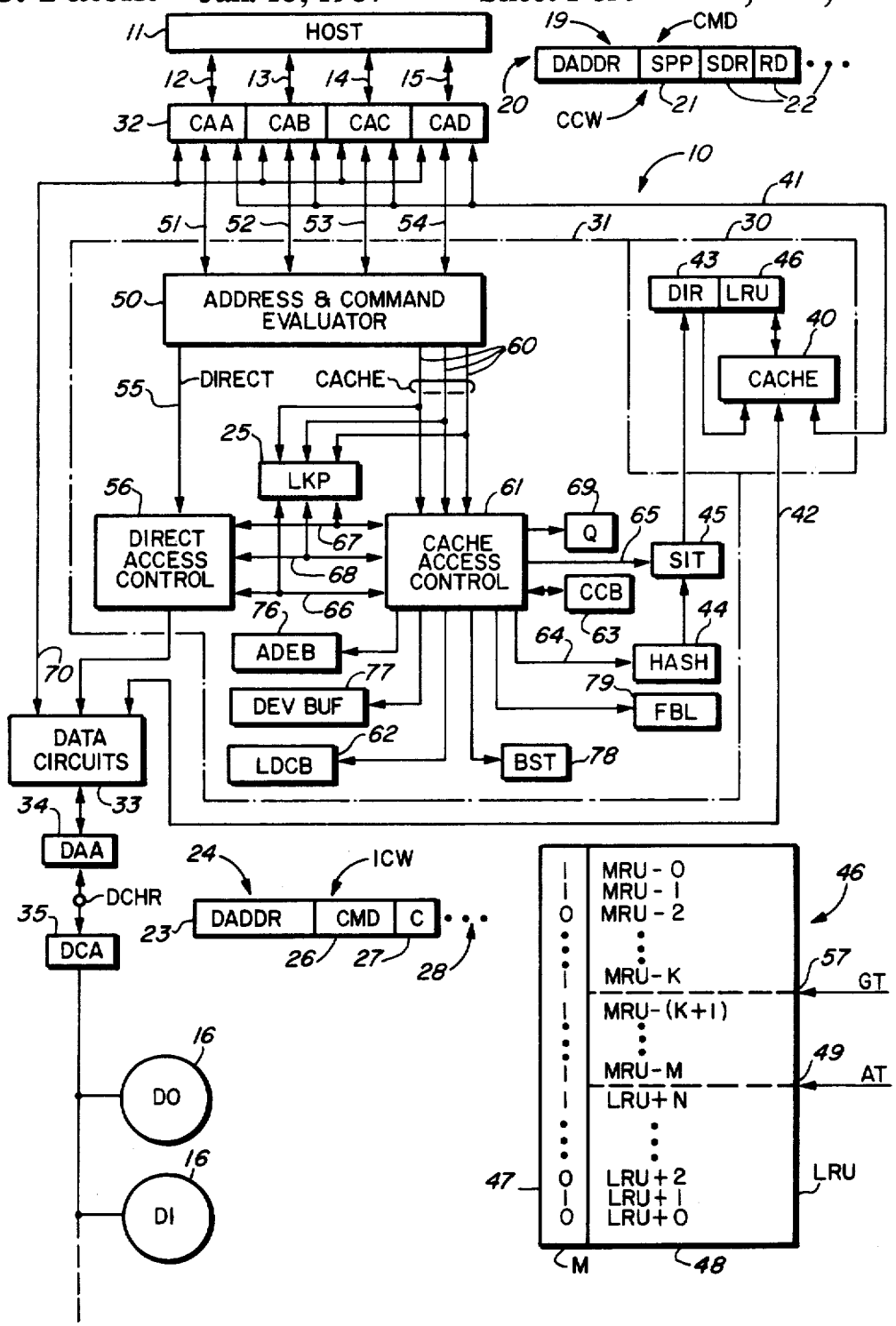
FIG. 1 is a logic diagram illustrating a peripheral data storage system connected to a host which incorporates the present invention. Also shown are channel command and internal command words and a cache replacement control list used in connection with practicing the invention.

Referring now more particularly to the drawing, like numerals indicate like parts and structural features in the various diagrams. An hierarchical peripheral data storage system 10 is attached to a host processor (hereinafter termed host) 11 for receiving storing and supplying data signals for the host. In a typical application of data storage system 10, host 11 consists of a central processing unit (CPU). In other variations, host 11 can be a virtual machine or a set of virtual machines running on a hardware CPU. Host 11 may also be a multiprocessor, a uniprocessor with attached processors and the like. While the invention can be applied to a great variety of data storage systems 10, the preferred and illustrated embodiment shows a paging peripheral data storage system for handling paging and swapping data sets. Generally, such paging and swapping data sets relate to storage of program data sets for host 11. As such, storage system 10 is usually attached to a single host while a general-application peripheral storage system can be attached to a plurality of such hosts. The invention can be applied to either type of peripheral data storage systems.

Communications between the paging storage system 10 and host 11 are via a plurality of input/output connections 12–15 which are constructed in accordance with the input/output peripheral channels of the IBM 370 series of computers available from International Business Machines Corporation, Armonk, N.Y. Such input/output connections, commonly referred to as channels and subchannels, are so well known that their description is not necessary. Storage system 10 has a lower, or backing, storage portion consisting of a plurality of direct access storage devices (DASD) 16 and separately enumerated D0, D1, . . . A11 accessing of stored data and storage of data by host 11 with respect to peripheral data storage system 10 is by addressing the DASDs 16. This addressing is achieved by using the architecture of the input/output connections 12–15 using channel command words (CCW) 19 as used in the channels for the IBM-designed input/output connections. Typically, each channel command word 19 includes an address byte 20. Each address byte 20 includes a plurality of bits for designating the control unit (CU) which is to receive the command. A second plurality of bits uniquely identifies the device (herein also referred to as DASD) 16 to be accessed. In a paging and swapping peripheral storage system 10, each of the devices 16 is provided with a plurality of logical device addresses, i.e., device D0, for example, can be addressed by any one of four addresses. Such multiple addressing has been practiced in the IBM 2305 paging storage system. The logical addresses for each device are indicated in yet other bits of address byte 20. In the present description, there are two logical device address bits for indicating which of the four logical addresses are being used by host 11 to address a device 16. In the presently constructed embodiment, one of the logical addresses 00 designates a direct access to devices 16. That is, host 11 operates with a device 16 as if peripheral data storage system 10 were not a hierarchical system. When the logical address bits are equal to 01, 10 or 11, the hierarchy, later described, is accessed for obtaining data from devices 16 or supplying data to those devices such that the apparent performance of those devices is enhanced on those three logical device addresses.

A second byte of CCW 19 is command byte 21, which contains a code permutation signifying to peripheral data storage system 10 what function is to be performed. The illustrated command, SPP, is a set paging parameter (mode set) command. A third byte 22 is a command modifier byte having a plurality of control fields which electrically indicate to peripheral data storage system 10 various modes of operation for executing the command indicated in byte 21. One bit SEQ indicates to peripheral data storage system 10 that the data to be transferred in an upcoming set of transfers will be sequential data. When SEQ portion of byte 22 indicates sequential data, then an additional command modifier byte (not shown) is included in the CCW 19 for indicating the number of blocks or segments of data which will be transferred from devices 16 to host 11, or in the reverse direction, as a sequential set of data. Such sequential sets of data in a paging environment are often referred to as swapping data sets. Additionally, byte 22 can indicate read and discard in section RD, which means that once host 11 obtains data from the hierarchy, that data in the hierarchy cache can be discarded; the data in the devices 16 is retained. Further controls (not shown) may also be provided.

The data storage hierarchy includes a system storage 30 of the semiconductor random access type which has a portion 40 designated as a cache for devices 16. Caching principles are sufficiently well known that the purposes and intent of cache 40 with respect to devices 16 need not be detailed. Control 31 receives the peripheral commands from host 11 for accessing devices 16 using one of the logical device addresses as well as providing access to cache 40 based upon the other three logical device addresses. Data is asynchronously (with respect to host operations) and automatically transferred by peripheral data storage system 10 between cache 40 and devices 16. (Transfers from devices 16 to cache 40 in response to host requests are synchronous transfers.) The data transfers are achieved using the same principles of data transfer as between host 11 and devices 16. For example, host 11 accesses devices 16 in a direct mode via channel adaptors 32, individually denominated CAA, CAB, CAC and CAD, then over bus 70 under control of direct access control DAC 56 through data circuits 33, device adaptor 34 and device control attachment DCA 35. Received commands 19 are interpreted by control 31 for determining the direction of data flow between host 11 and devices 16 as well as other functions as is well known for controlling this type of peripheral data storage apparatus. The relationships of cache 40 to devices 16 are substantially identical to the relationships between host 11 and devices 16. That is, while host 11 provides control via a series of CCWs 19, control 31 provides access between cache 40 and devices 16 by using a plurality of internal control words (ICWs) which are structured in a similar manner to the CCWs, as will become apparent. Certain efficiencies in data transfer operations can be provided by altering the ICWs 24 with respect to the CCWs 19. Instead of going through the channel adaptors 32, control 31 includes a cache access control CAC 61 which operates system storage 30 and provides access to devices 16 through direct access control DAC 56 using the ICWs 24. Instead of channel adaptors 32, a linkage port LKP 25 provides for transfers between CAC 61 and DAC 56. LKP 25 is described later with respect to FIG. 3.

Each ICW 24 includes a command byte 26 corresponding to CCW command byte 21. It should be appreciated that the code permutations for identical commands are the same. Some additional commands may be provided while some of the CCW commands are dispensed with. A command modifier byte 27 includes a chain control bit "CHAIN" which replaces the chaining indication normally provided by host 11 to control 31 via channel adaptors 32. (The chaining indication by host 11 is the supplying of a SUPPRESS OUT tag signal.) Bytes 23 of each ICW 24 point to a stored location of the address of the devices 16. No logical addresses are used in the ICWs. In fact, control 31 converts all of the logical addresses directed to the hierarchy into actual device address bits. Address bytes 28 not only point to the stored location of the device address but also point to the cylinder address (C), the head or track address (H) and the record address (R). The data record or block address corresponds to a sector address used in addressing most disk storage apparatus. In a preferred embodiment, four records were provided on a single track (H address); hence, the record address is 1, 2, 3 or 4, corresponding to an effective orientation of 0°, 90°, 180°, and 270° of the disk with respect to a reference rotational point. Design parameters may dictate actual rotational orientations that may differ from the orthogonal orientations. Received record addresses are all converted to one of the four rotational record addresses.

Cache 40 transfers data signals with host 11 through channel adaptors 32 and bus 41. In a similar manner, data is transferred between devices 16 and cache 40 through data circuits 33 and bus 42. When simultaneous transfers between cache 40 and host 11 or DASDs 16 are not desired, buses 41 and 42 are combined into a single bus which is time-shared by the data transfers. Accessing cache 40, which can be a relatively large memory (several megabytes), requires CAC 61 to transfer the device address together with the cylinder and record addresses CHR over bus 64 to hash circuit 44. Hash circuit 44, which function may be microcode implemented, converts the received DASD address into a hash class indicator. Since the storage capacity of cache 40 is much less than devices 16, for ease of access the address ranges of devices 16 are concentrated into classes called hash classes. A scatter index table SIT 45 has one register for each of the classes defined by hash circuit 44. The contents of the registers in SIT 45 are address pointers to a directory DIR 43 which contains the address DCHR used to access devices 16. When data is stored in cache 40, the DASD 16 DCHR address together with the cache 40 address is stored in a so-called entry (register) of DIR 43. Since a plurality of device addresses corresponds to one hash class, a singly-linked hash class list is provided in the entries of DIR 43 such that scanning cache 40 using hashing only requires scanning the entries within a given hash class. Based upon the contents of directory 43, cache 40 is accessed using known techniques. If no related entries to the access request are found in directory 43, then a cache miss occurs, requiring CAC 61 either to allocate space in cache 40 for receiving data from host 11 or to transfer data from a device 16 using ICWs 24 and linkage port LKP 25. Control 31 also includes the usual control portions of control units that attach to hosts. For example, address and command evaluator ACE 50 communicates with channel adaptors 32 via buses 51, 52, 53, and 54 for receiving command signals from host 11 and supplying status signals to host 11. ACE 50 evaluates CCWs 19 and instructs the peripheral memory system 10 to perform the commanded function as well as indicating the chaining conditions and receiving status signals from the other portions of the peripheral system for relaying to host 11. In a direct mode, ACE 50 supplies command signals over bus 55 to DAC 56 such that data signals can be transferred over bus 70 between data circuits 33 and the appropriate channel adaptor 32 using known DASD peripheral storage device techniques. In executing its functions, DAC 56 exercises control over data circuits 33 in the usual manner.

The operation of the data storage hierarchy is such that sequential data sets can be placed in cache 40 using a minimal-size cache with minimal allocation controls while maintaining sequentiality in an efficient manner and maintaining a sufficient number of the data blocks in cache to satisfy the operating requirements of host 11. ACE 50, when receiving a logical device address in byte 20, supplies the received command signals over one of the three buses 60 (in accordance with the logical address) to CAC 61. The three buses are logical buses indicating the respective cache 40 accesses. CAC 61 stores the received command and modifier data in a logical device control block LDCB 62. Remember there are three logical device addresses for each of the devices. Therefore if there are eight devices 16, there will be twenty-four LDCBs 62.

The identification and operational status of each logical device is kept in a respective one of logical device control blocks LDCB 62. Access to the logical device, which is represented by allocation of registers in cache 40 to the device address, is via address bus 64 to hash circuit 44. In certain situations for sequential data, sequential addresses for devices 16 (CHR portion) successive registers in SIT 45 can be accessed. Accordingly, CAC 61 accesses SIT 45 via bus 65 to avoid the delay in hash circuit 44. This operation enhances the response of peripheral system 10 to host 11 when sequential data is being processed.

When CAC 61 receives a cache miss indication from searching the hash class of DIR 43, for a read request a request for a data transfer from devices 16 to cache 40 is supplied over bus 66 to DAC 56 via LKP 25. The bus 66 signal alerts DAC 56 to the request and indicates the ICWs are addressable via LKP 25. In the preferred microcode embodiment, LKP 25 is a microcode linkage port, as will become apparent. DAC 56 responds to the ICWs 24 in the same manner that it responds to the CCWs 19. Upon completion of the rear data transfer (DASD to cache 40), as requested through LKP 25, DAC 56 supplies status signals over bus 67 to CAC 61. At that time, cache 40 has data available to host 11. A write miss usually results in cache 40 space being allocated and then receiving data from the host.

Further communications between CAC 61 and DAC 56 are via bus 68, all such communications including storing message data in LKP 25. Because devices 16 are accessed through a plurality of logical device addresses, a set of queuing registers Q 69 queue device-related operations requested by CAC 61. In this manner, DAC 56 may not be concerned with the queuing requests through the logical devices but can operate in a direct-access DASD mode for host 11 and for CAC 61. DAC 56 can be used not only in connection with the data storage hierarchy, but can be used also in those peripheral storage systems not employing a hierarchy.

CAC 61 also includes additional controls, for example, register ADEB 76 contains one entry of directory 43 with which CAC 61 is currently operating. The address of a device 16 resulted in a cache 40 hit or a portion of cache 40 was allocated to data to be supplied by host 11; by placing the entry in register ADEB 76, operation of CAC 61 is enhanced. That is, directory 43 is a part of system storage 30; by placing the active entry in ADEB 76, system storage 30 is free to transfer data over buses 41 and 42 independent of control 31. Device buffer (DEV BUF) registers 77 contain control information relating to a device 16 and are used by CAC 61 in setting up accesses through DAC 56. Such registers are found in a writable control store in the microcoded implementation of the invention. Buffer 77 is merely an allocated portion of control store with no designated data structure. BST 78 is a buffer sequence table described later with respect to FIG. 3. BST 78 includes pointers to directory 43 for each of the data blocks to be transferred in a sequence of data blocks over bus 42 as well as a scanning control mechanism for determining which directory index is to be used for accessing cache 40 during the sequential transfer. In this manner, a sequential transfer can dispense with addressing setups such that a burst of blocks from a device 16 can be made without interruption, as will become apparent. CCB 63 is a channel control block containing control information about a present data transfer being made via a channel adaptor 32. FBL 79 is a free block list indicating which of the cache 40 addressable storage areas (blocks, slots, etc.) is currently available for allocation to receive and store data signals from either host 11 or device 16. It is a purpose of the present invention to keep FBL 79 at a given maximal number of entries.

Directory 43 includes a cache replacement LRU list 46. LRU list 46 signifies least recent usage as criteria for arranging the list of cache 40 addressable areas for establishing a replacement control. The LRU list 46 in the practical embodiment is illustrated in FIG. 4. Logically, it is shown in FIG. 1 for making the practice of the present invention more easily understood. LRU list 46 includes a first and second portion. A first portion 47 signifies whether or not the data contained in the identified addressable area has been modified (such modifications and LRU list are in directory 43). The addressable areas are listed in accordance with the most recent usage (MRU) of the respective addressable data storage areas by host 11 through channel adaptors 32. The last-referenced addressable storage area of cache 40 is the most recently used (MRU) addressable storage area. As such, it is listed as MRU-0 in LRU 46. As shown in FIG. 1, MRU-0 which is identified by a cache address, for example, has been modified, i.e., the last reference was a write reference. In a similar manner, the next most recently used addressable data storage area of cache 40 is MRU-1; in the illustration that data was also modified such that the data in cache 40 is different than the data stored in the corresponding device 16. However, MRU-2, the third most recently used addressable data storage area of cache 40, has data stored in cache 40 identical to the data stored in the corresponding device 16. The lesser recent usage proceeds to the least recently used addressable storage area, LRU+0. The next least recently used addressable storage area of cache 40 is LRU+1 and so forth. In a large cache 40, it is to be appreciated that a corresponding large number of entries occur in LRU 46, for example, in the thousands.

All of the addressable storage areas of cache 40, which in LRU list 46 lie between LRU+0 and LRU+N are below the availability threshold at 49. When LRU list 46 is scanned and when an entry identifying an addressable data storage area storing modified data is found, a transfer of the data stored in cache 40 for each modified addressable area to device 16 is initiated. A second threshold GT 57 is the upper, or grouping, threshold for grouping data stored in diverse addressable data storage areas of cache 40 for transfer to a DASD 16 as a single stream of data. As mentioned earlier, the grouping is limited to a cylinder of tracks on a given device 16. A cylinder of tracks is all those tracks at a common radial position, i.e., can be accessed via electronic switching as opposed to radial movements of a set of transducers (not shown). Accordingly, when a data transfer is initiated by a scan between LRU+0 and AT 49, the scan will continue through GT 57 to assemble a group of data blocks to be written to a device 16. For example, LRU+1 is the least recently used modified block of data stored in cache 40. This action can result in a plurality of blocks being transferred to a device 16. For example, LRU+N can identify data to be stored in the same cylinder with the LRU+1 identified data; hence, will be grouped with LRU+1 for writing. MRU-M, just above AT 49, can be in a different cylinder; hence, will be outside the group. Other blocks of data in cache 40 such as MRU-(K+1), just below GT 57, is modified and can be in the same cylinder as LRU+1. All of the data above GT 57 is not subject to being written to a device 16 because the recentness of the last reference indicates there is a strong likelihood that the data may again be quickly referenced by the host 11. Such a reference can be a write reference; therefore, moving data from cache 40 above GT 57 results in unnecessary data transfers; hence, degrades performance.

In accordance with all of the above, the selection of AT 49 and GT 57 is based upon the particular operating characteristics by peripheral data storage system 10 as it is currently operating with host 11. This means the thresholds AT 49 and GT 57 may be subject to change over extended periods of time. The main essence is that a first scan up through the availability threshold AT 49 results in initiating a data transfer. The scan continues to GT 57 for adding blocks to the data transfer initiated by a first found block to be transferred. This continued scan results in grouping a set of additional data blocks for a group data transfer to a device 16. This grouping reduces the number of times a device 16 has to be selected and thereby creates efficiency in data transfers.

Figure 2:
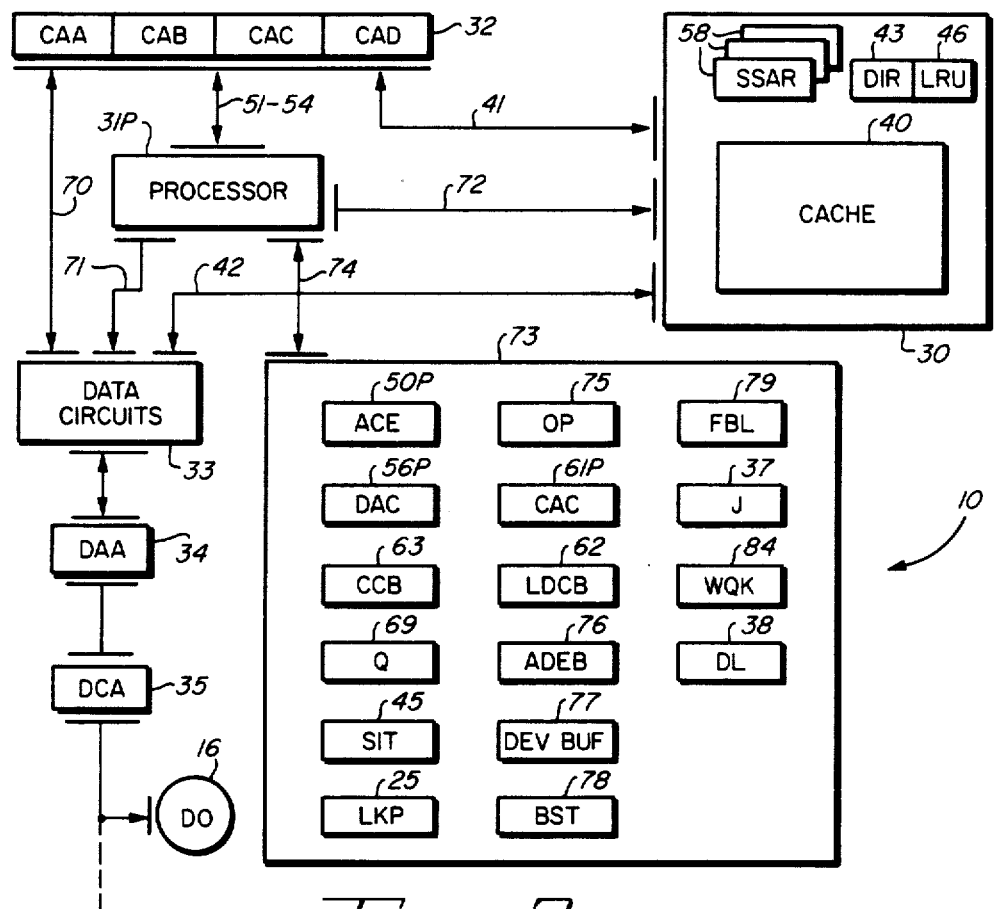
FIG. 2 is a logic block diagram of a preferred implementation of the FIG. 1 illustrated system employing a programmed processor for controlling the peripheral data storage system.

FIG. 2 is a block diagram of a preferred embodiment of the FIG. 1 illustrated system which employs a programmed microprocessor 31P within control 31. Bus 70 extends from channel adaptors 32 to data circuits 33 and operates in an identical manner as shown for FIG. 1. Buses 41 and 42 extend respectively from channel adaptors 32 and data circuits 33 to system storage 30. Buses 41 and 42 may be combined into one bus with data transfers time-sharing the single bus. Processor 31P, in controlling the transfer between data circuits 33 and system storage 30, provides control signals over bus 71 to circuits 33 and address and sequencing control signals over bus 72 to system storage 30. A plurality of system storage address registers SSAR 58 provide addresses to system storage 30. For example, eight or sixteen SSARs 58 may be provided. Therefore when processor 31P accesses system storage 30, not only does it give the address of the system storage 30 to an SSAR 58, but it also indicates which of the SSARs is to be used in accessing the storage. Multiplex addressing registers to a memory are known and therefore not further described. In practicing the present invention, an SSAR 58 for each block of the burst of sequential data blocks is loaded by processor 31P with the addresses of a cache 40 register (a portion of system storage 30). This priming of system storage 30 means that the cache address for the data blocks to be transferred need not be loaded into an SSAR 58 intermediate the successive sequentially transferred blocks. Therefore during the sequential transfer, processor 31P merely refers to an SSAR for initiating the transfer of data signals between cache 40 and a device 16. It should be noted that cache 40 has a given address space within system storage 30. In a similar manner, directory 43 has a different range of addresses. SSARs 58 are separate electronic registers outside the memory array of system storage 30. Processor 31P communicates with channel adaptors 32 over a single bus denominated 51-54.

Operation of processor 31P is in accordance with microcode programs stored in a control store 73 which is preferably writable, although a portion can be writable while another portion containing certain programs can be read-only. Bus 74 couples the processor 31P to control store 73. Within control store 73 are programs ACE 50P which implement the function of address and command evaluator 50, DAC 56P which are programs to implement the function of direct access control 56, CAC program 61P which implements the functions of cache access control 61 and OP 75 which are other programs necessary for operation of the storage system 10 but which are not necessary to an understanding of the present invention. The registers storing data structures used by processor 31P to control the system 10 via the programs 50P, 56P and 61P include CCB 63, LDCB 62, queue registers 69, ADEB 76, SIT 45, buffer 77, LKP 25 and BST 78. Also used are later-described registers for containing FBL 79, write queue counter WQK 84, j counter 37 and discard list DL 38. For an extremely large cache 40, SIT 45 can be stored in system storage 30. To enhance performance, a set of registers for containing a page of SIT 45 can be reserved in control store 73.

Figure 3:
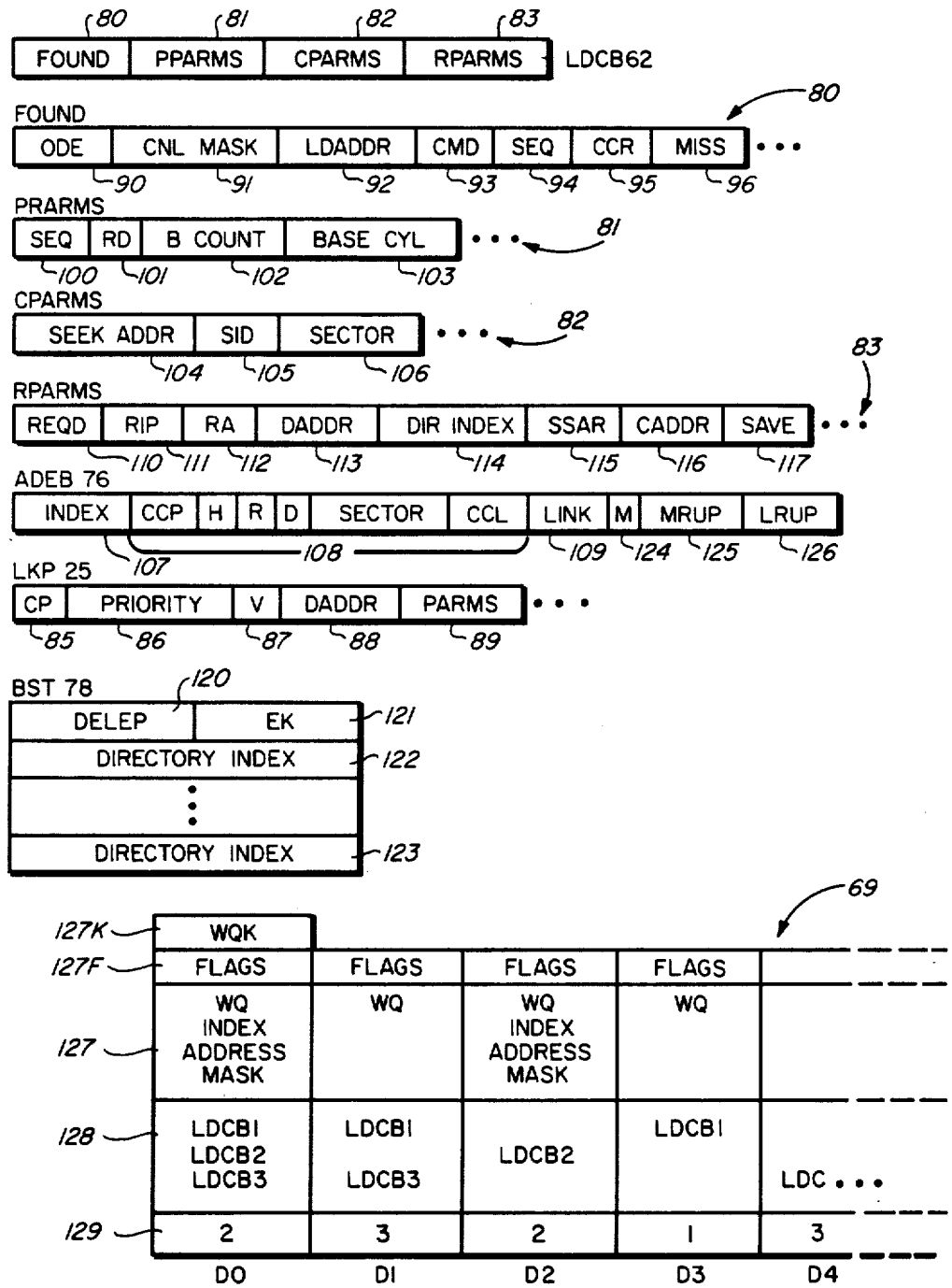
FIG. 3 illustrates various data structures used in connection with the operation of the FIGS. 1 and 2 illustrated peripheral data storage system.
Figure 10:
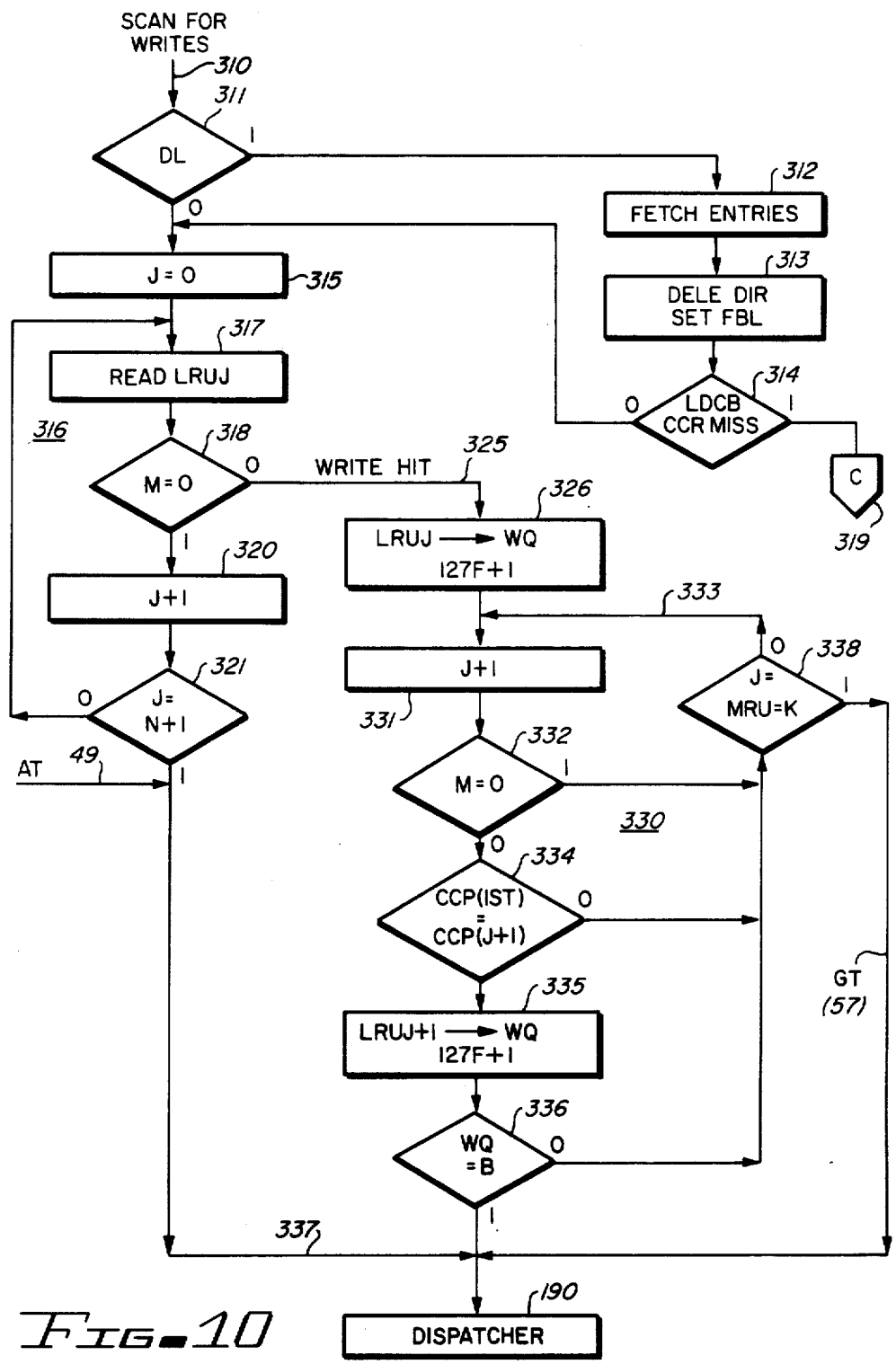
FIG. 10 is a simplified machine-operations flow chart which illustrates write grouping of asynchronous writing operations.
Figure 11:
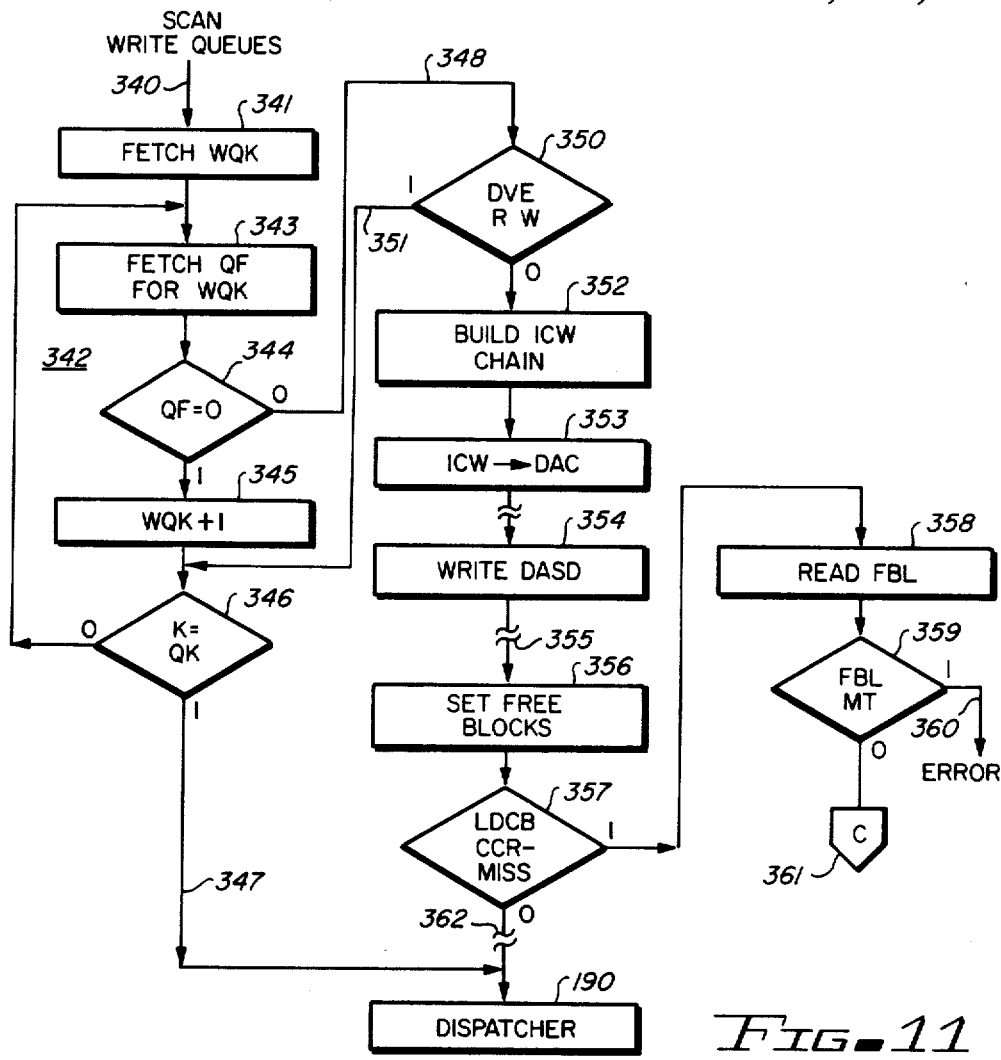
FIG. 11 is a simplified machine-operations flow chart showing scanning queues of grouped data to be written from cache to DASD.
Figure 12:
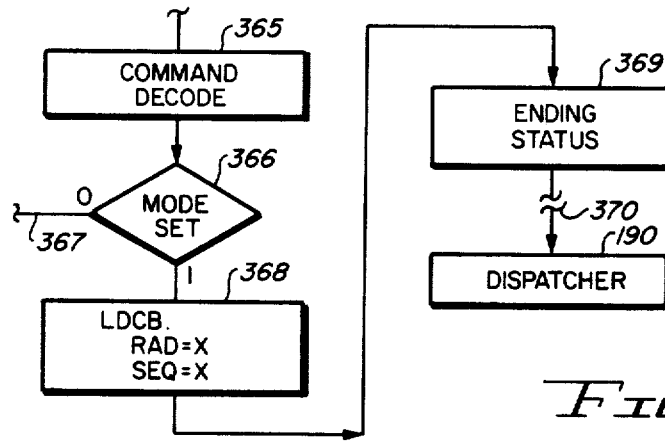
FIG. 12 is a simplified machine-operations flow chart showing execution of a mode setting command.

Operation of the FIG. 2 illustrated preferred embodiment is best understood by reference to FIGS. 3 through 12 which illustrate the data structures in detail as well as machine-operation flow diagrams for the microcode portions necessary for an understanding of the operation of the present invention. FIG. 3 illustrates the data structures used by a processor 31P to operate peripheral system 10 in accordance with the invention. LDCB 62 is a series of registers containing data signals in control store 73 consisting of four sections. A first section 80 is a so-called foundation data structure which defines and supports the functions of peripheral system 10 in a general operational sense. PPARMS 81 is that portion of LDCB 62 relating to the parameters defining a paging and swapping function established through the later-described set paging parameters command (FIG. 12). CPARMS 82 contains command parameters such as set sector, seek, search ID command issued by host 11. These commands are those used in connection with known disk storage apparatus peripheral storage systems. RPARMS 83 contain the parameters for supporting read activity; i.e., transferring data signals from device 16 to cache 40.

The foundation portion 80 includes a bit ODE 90 which signifies whether or not a device end (DE) is owed by peripheral data storage system 10 to host 11. CNL MASK 91 contains a bit pattern indicating which channel adaptor 32 received the current command, i.e., which channel the logical device has an affinity to. LDADDR 92 contains a code permutation indicating a logical address received with the command. CMD 93 contains the code permutation from byte 21 of FIG. 1. SEQ 94 contains the contents of SEQ section of byte 22 of FIG. 1. CCR 95 indicates whether a channel command retry has been sent to host 11 by data storage system 10. In this regard, when a cache miss is indicated in section 96, a channel command retry is sent to host 11. Therefore LDCB 62 signifies at 96 when a miss has occurred for cache 40 and whether or not system 10 has supplied the appropriate CCR signal. Channel command retries merely signify to host 11 that a delay in executing the received peripheral command is required. Data storage system 10 upon reaching a state in which the command can be executed will send a device end (DE) signal to the host. The host then sends the previous peripheral command such that the command can then be executed by data storage system 10.

PPARMS 81 includes a sequential bit 100 corresponding to the sequential bit SEQ in byte 22 as well as the RD indicator 101 from RD section of byte 22. B COUNT 102 contains the number of blocks to be transferred as a sequential set. As each block of the sequential data set is transferred to host 11, B COUNT 102 is decremented by one. Therefore, it indicates the number of blocks yet to be transmitted to host 11 through cache 40. BASE CYL 103 contains the cylinder address C from which the sequential data will be transmitted from devices 16, i.e., in a multicylinder request, BASE CYL 103 contains the value C of a virtual machine (VM) minidisk.

CPARMS 82 contains the DASD seek address in SEEK ADDR 104, the last or current search ID argument in SID 105 and the last or current set sector value in SECTOR 106.

RPARMS 83 includes REQD 110 indicating that a data transfer from a device 16 to cache 40 is required. RIP 111 indicates that a read is in progress from a device 16 to cache 40. RA 112 indicates that a read has been completed from a device 16 and that certain post-processing functions (not described) are being performed. DADDR 113 contains the device address from byte 20 (FIG. 1) for indicating the accessed device 16 being addressed. DIR INDEX 114 contains a directory 43 index value for indicating which directory entry register contains the entry corresponding to the logical device identified in the particular LDCB 62 registers. SSAR 115 identifies which SSAR 58 will be used in accessing cache 40 in a data transfer between a device 16 and cache 40. SAVE 117 indicates an area of the LDCB 62 registers which processor 31P uses to save control data signals during various operations, including interruption operations.

ADEB 76 is structured in the same way that each entry of directory 43 is structured. Accordingly, description of ADEB 76 amounts to a description of directory 43. In each entry of directory 43 as well as ADEB 76, INDEX 107 is the logical address of the directory entry. This field contains self-identifying data for each entry. Section 108 contains the address of a device 16 corresponding to the data stored in cache or allocated for storage. CCP is the physical cylinder address, i.e., the actual physical address of the cylinder for a device 16, H is the head address, R is the record address, D is the device address and SECTOR is the actual sector value, i.e., rotational position of the disk from which a data access will begin. The R value for tracks having four records can vary from one to four while the sector value is the actual sector address. In addressing the DASD, the R value is translated into a rotational position indicator at the byte level as in usual DASD addressing techniques. The R value in some host operating systems can range from 1–120 or other numbers; in such cases the larger R values are reduced to a value modulo the number of records N in a track. Then the R value, modulo N, is converted to a rotational address of the disk. Such sector value is suitable for initiating access to a record with a minimal latency delay. CCL is the logical cylinder address such as provided for logical devices which are defined on physical devices. Link 109 contains the data signal code permutation of the singly-linked list for linking all entries of a single hash class together. The last entry of a given hash class will have a particular code pattern (zeroes) indicating end of chain or end of class. M bit 124 indicates whether or not the data in cache 40 has been modified since it was received from a device 16; this section corresponds to M column 47 of FIG. 1. MRUP 125 is a pointer to a next more recently used addressable storage area of cache 40, while LRUP 126 is a pointer to a next less recently used addressable storage area of cache 40. These pointers are the index values of section 107 for the respective entries. MRUP and LRUP constitute a doubly-linked list described later with respect to FIG. 4. Other code permutations can be added to each directory 43 entry which are not pertinent to an understanding of the present invention.

LKP 25 is an area in control store 73 accessible by programs ACE 50P, DAC 56P and CAC 61P which make up a linkage port or message area for controlling the interaction of the execution of these microcode units. In one embodiment, ACE 50P and DAC 56P were treated as one code segment such that LKP 25 was accessed by those two microcode sections as a single unit. In any event, the structure of the port includes a code point CP 85 which identifies the portion of the microcode which lodged the control data in the port. That is, when CAC 61P lodges an entry in LKP 25, DAC 56P will fetch the control data and execute the function. Then when DAC 56P enters new data in LKP 25 responding to the request by CAC 61P, CP 85 indicates to CAC 61P which point in its code execution the DAC 56P reply relates to for continued processing. PRIORITY section 86 contains code permutations indicating whether the request lodged in LKP 25 is high priority, low priority or a continued processing indication. V bit 87 indicates whether or not LKP 25 entry is valid, i.e., is it a recent entry requiring action. DADDR section 88 contains the device address from byte 20 for identifying which device 16 is associated with the current LKP 25 control data signals. PARMS 89 contains various parameters associated with the message, i.e., what function is to be performed, status and the like.

BST 78 has a set of registers for each of the devices 16. A first register includes section DELEP 120 which contains an index value of 1 to 8 pointing to the directory indices 122–123. These indices identify the directory entries to be deleted. EK 121 contains a count of the number of valid entries in the table. It is also used as an address; for example, the first directory pointer index is always stored in 122 while the 8th one is always stored at 123. For a value of 3 in EK 121, a third directory index is accessed. Directory index, remember, is a logical address of a directory 43 entry, hence is a rapid access into directory 43.

Operations between system storage 30 and devices 16 are asynchronous and substantially independent of operations between host 11 and devices 16 as well as the operations between host 11 and system storage 30. To achieve this operation, a set of read queues 128 and write queues 127 are established in queue registers 69. Queue registers 69 include write queue 127 which has a separate queue for each of the devices labeled D0–D4. . . . Each write queue register contains the index directory 43 stored in the respective INDEX 107 for entries identifying write operations. The write queues also store the addresses necessary for accessing the devices 16 which include a SEEK argument, SEARCH argument, SECTOR, device mask and the address portion for accessing cache 40, such as the cache block address and the SSAR 58. A link field can be included to contain a pointer to a next entry in the write queue 127 for the respective devices or for pointing to the next device write operation, i.e., which record in cache 40 is to be next written to a device 16. Accordingly, write queues 127 can contain one or a plurality of references to cache 40 addressable storage areas for accessing data blocks to be written to each device 16. Each write queue includes a flag counter 127F which signifies, when non zero, that there are a number of entries in write queue 127 equal to the count in 127F and, when reset to zero, that the associated write queue 127 is empty. Write queue counter WQK 127K is an 8-bit shift register having one bit set to identify which write queue 127 is to be next scanned for entries. Each scan results in shifting WQK 127K one bit pointing to indicate a next write queue 127.

Queue 69 also includes read queues 128, each of which includes portions 128 and 129 which constitute a round-robin queue. Portion 128 contains the LDCB 62 addresses for identifying which logical devices require data transfer from a device 16 to cache 40. Portion 129 contacts a pointer to one of three possible entries in each queue for indicating which logical device is to be next serviced. A pointer 129 equalling zero indicates an empty queue. For example, D0 portion 129 contains numeral 2 indicating that LDCB 2 is to be next serviced; following LDCB 2 then LDCB 3 will be serviced, then 1. D0 has a full read queue for all logical devices associated with D0 device 16. Device D1 has two entries in this read queue, LDCB 1 and LDCB 3 with the pointer number 3 in portion 129 indicating that LDCB 3 is to be next serviced. Accessing the read queue 128 enables processor 31P to access the correct LDCB 62 for transferring data from a device 16 to cache 40 in an appropriate sequence relative to the sequence that the data was requested by host 11. Other forms of priority determination may be used while practicing the present invention. In addition to the registers shown in FIG. 3, other registers may be employed in constructing a data storage system 10; these registers are not necessary to an understanding of how to practice the present invention in the illustrated environment.

LRU 46 rather than being a push-down singly-linked stack shown in FIG. 1 is preferably a doubly-linked list as shown in FIG. 4. The list is organized in accordance with the directory 43 index which corresponds to a cache address CADDR as set forth in column 116. CADDR having a value of one corresponds to the lowest memory address of cache 40, while CADDR having a value of two indicates the memory address of cache 40 for the second addressable data storage area of cache 40, and so forth. MRUP 125 is a column of pointers pointing toward entries in LRU list 46 that are the more recently used addressable data storage areas of cache 40. In the FIG. 4 illustration, CADDR M+2 is the MRU addressable data storage area of cache as indicated by the zero in MRUP. In a similar manner, the least recently used pointers LRUP 126 point toward the next addressable data storage area identification which is next less recently used. The one that is least recently used is K+2 as identified by the zero in LRUP column 126. It should be noted that work registers (not shown) within processor 31P contain the address of the MRU and LRU addressable storage areas such that the LRU list 46 can be scanned either from the LRU end or the MRU end (as shown in FIG. 1). The pointers are established in the usual doubly-linked list pattern. For example, the MRUP of CADDR K+2, the LRU element, is equal to 1. Going to the CADDR having a value of 1 finds the LRUP with a value of K+2 and MRUP having a value of M which is the next more recently used element. Going to the element having CADDR "M" finds an LRUP value of 1 with an MRUP value of two hyphens. Two hyphens indicate that there are additional entries in the list not shown for purposes of simplicity. In a similar manner, CADDR value 2 has an LRUP pointer of two hyphens to indicate omitted entries. For illustrating that the AT and GT thresholds can be anywhere within the doubly-linked list, the threshold symbols GT 57 and AT 49 are shown as existing anyplace within the LRU 46 doubly-linked list. In a scan for such thresholds, the number of elements scanned will be counted and compared with a numerical value for determining whether the threshold has been reached or not, all as described in FIG. 10.

Figure 5:
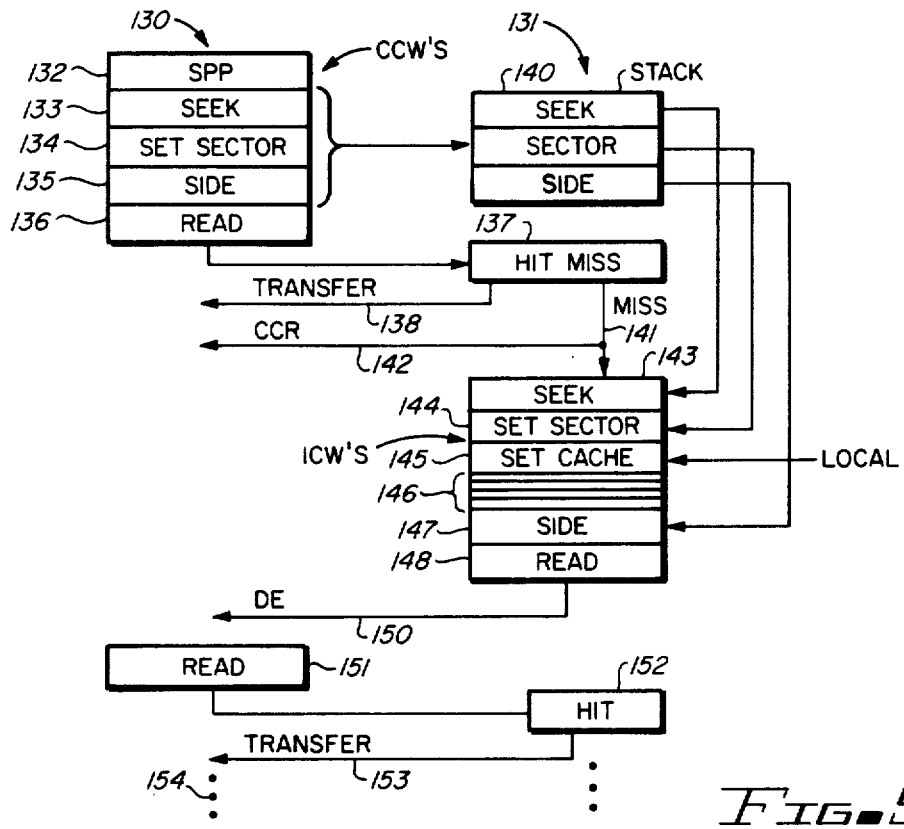
FIG. 5 diagrammatically illustrates a mode of operation of the FIGS. 1 and 2 illustrated peripheral memory system employing channel command words and internal command words.

FIG. 5 illustrates a sequence of CCWs and ICWs in a read or write data transfer. A read transfer transfers signals from a device 16 to host 11, while the write transfer is a data transfer in the reverse direction. A chain of CCWs 130 begins with set paging parameters (SPP) CCW 132. FIG. 12 illustrates the execution of such a command by storage system 10. Fundamentally, SPP 132 sets whether or not data read to host 11 from cache 40 can be discarded, as well as other parameters identified in byte 22 of CCW 19 (FIG. 1). Once SPP has indicated parameters of operation to system 10, a SEEK CCW 133 results in a seek command being transferred to the peripheral storage system; in one embodiment the seek parameters were embedded in the SPP command. Using normal DASD architecture, SEEK is followed by SET SECTOR CCW 134 which in turn is followed by a search ID equal (SIDE) 135. Now the storage system is ready to read data from an addressed device 16 by READ CCW 136. Upon receipt of the READ command, peripheral data storage system 10 provides the action indicated in column 131. First of all, the SEEK, SET SECTOR and SIDE commands are stacked as at 140. At 137, a directory 43 search, as explained with respect to FIG. 1, is conducted. For a cache hit, i.e., the requested data is in cache 40, the data is immediately transferred as indicated by arrow 138 from cache 40 to host 11 via the channel adaptor 32 which received the command. On the other hand, if directory 43 indicated the data was not in the cache, then a cache miss has occurred, as indicated by arrow 141. A channel command retry (CCR) is supplied by system 10 as indicated by arrow 142. The CCR tells host 11 that, when a DEVICE END signal is received from system 10, the READ CCW 136 must be reexecuted by the channel by sending the same READ command to system 10. While this is occurring, system 10 constructs a chain of ICWs 143–148 beginning with a SEEK ICW 143 which is derived from the stacked SEEK commands received from host 11. For a multitrack operation, the ICWs are derived from search ID parameters. The SEEK ICW 143 is followed by a SET SECTOR ICW 144 which has the sector calculated from the record number. At 145, the local input results in a SET CACHE ICW 145. This ICW causes DAC 56P to insert into the appropriate SSAR 58 the address of system storage 30 at which the data to be read will be stored. If a plurality of blocks of data are to be transferred, then a plurality of SET CACHE ICWs occur as indicated by numeral 146. Then a SEARCH ID EQUAL ICW 147 corresponding to the SIDE CCW 135 occurs. The SEARCH ID EQUAL ICW 147 corresponds to the first SET CACHE ICW 145. This means a plurality of blocks of data are read in sequence using but one SIDE ICW 147. Then a number of READ ICWs 148 equal to the number of data blocks to be transferred are given to DAC 56P for reading a predetermined number of blocks of data indicated by the number of SET CACHE ICWs. Upon completion of the read, which transfers data from the addressed device 16 to cache 40 at the addresses set in SSARs 58, system 10 supplies a device end (DE), as indicated by arrow 150, to host 11. Host 11 immediately responds by reissuing a peripheral command at 151 corresponding to the CCW 136. Of course, system 10 searches directory 43 at 152 resulting in a cache hit because of the just-executed ICW chain. Data is then transferred from cache 40 to host 11 as indicated by arrow 153. In the event that the data was not transferred for the requested data block at CCW 136, another cache miss will occur and an error status will be reported to host 11. This error status will reflect the fact that system 10 was unable to transfer data from the addressed device 16 at the requested cylinder, head and record address. Host 11 then can use the direct access route for attempting recovery using standard disk storage apparatus recovery techniques beyond the scope of the present description. Ellipsis 154 indicates that the above-described operation is highly repetitive as well as indicating that various CCW chains for various devices 16 can be interleaved. The ICW chains do not necessarily follow the sequence of chains of CCWs. Depending upon the circumstances, an ICW chain may be constructed and used by a later-occurring CCW chain. Such possibility indicates the asynchronous aspect of the ICW chains with respect to the CCW chains. Usually, the first CCW chain will result in a first-occurring ICW chain. At any instant, a separate ICW chain can be active for each device. The SEEK, SET SECTOR, and SIDE CCWs 133–135 are not described since they are well known.

Figure 6:
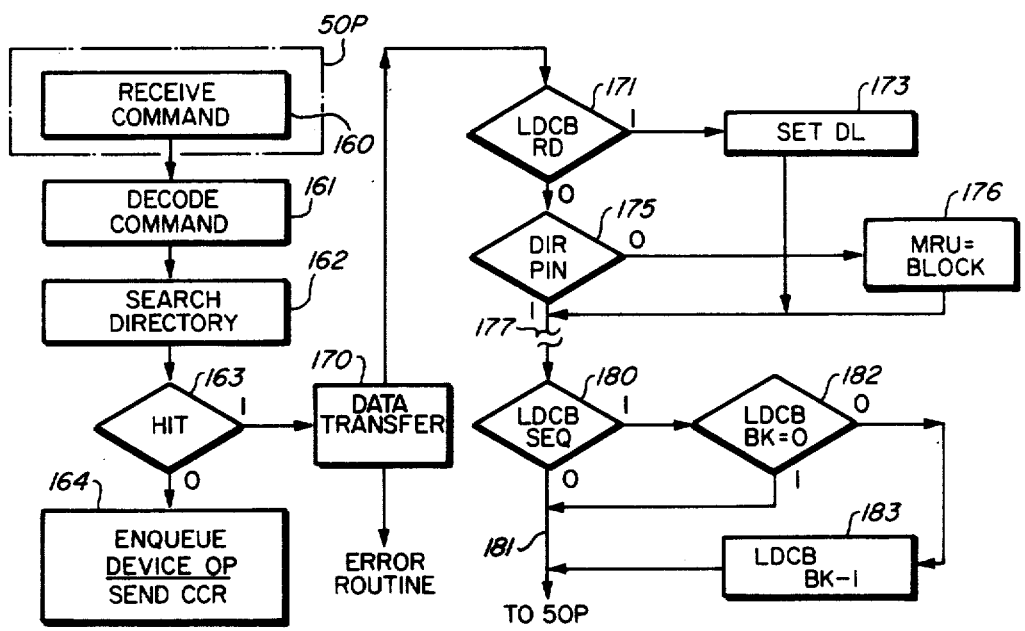
FIG. 6 is a simplified machine-operations flow diagram for a read command execution together with a cache hit logic flow for the FIGS. 1 and 2 illustrated data storage system.

FIG. 6 illustrates the machine operations for transferring sequential read data. At step 160 the received command is processed by ACE 50P. Then through LKP 25, CAC 61P is activated by processor 31P. The command is again decoded at step 161 by CAC 61P. Since it is a READ command, directory 43 is searched at step 162 as described with respect to FIG. 1. At step 163, processor 31P determines whether or not the directory search resulted in a cache hit or a cache miss. For a cache miss, the received command is enqueued at step 164 by placing the command and its control information in queue registers 69. A CCR is sent to host 11. Queue registers 69 can use any format, the queue is a first-in first-out queue for each of the addressable devices 16, i.e., for eight devices 16 there are eight queues. The importance of having a FIFO queue is to ensure that the sequence of responses to the host for a given device corresponds to the sequence of commands sent by the host. From queue 69, CAC 61P will initiate a read from the addressed device 16 by building an ICW chain 131.

A cache hit by directory search at 163 results in cache 40 automatically transferring data to host 11 via the appropriate channel adaptor 32 at step 170. Such automatic cache-to-host transfers are well known and not described for that reason. During the automatic data transfer an error can occur; accordingly, upon an error detection, processor 31P goes to an error reporting and analyzing routine (not shown). Generally the data transfers will be error free. At step 171 following the successful completion of a data transfer, processor 31P accesses LDCB 62 to examine RD section 101. If discard-after-read is indicated, processor 31P at step 173 sets the just-read block of data stored in cache for discard in DL 38 of control store 73. Discard is performed by processor 31P (when no commands are being executed) by accessing DIR 43 in system storage 30 to erase the directory 43 entry. Discarding the data prior to requirement of a replacement algorithm being invoked reduces the control required for efficiently managing cache 40, i.e., free addressable data storage areas are made available before they are needed. If RD=0 at step 171, (not read-and-discard), processor 31P at step 175 determines from directory 43 in a field (not shown) whether or not the data is pinned to cache 40. Pinning data to cache 40 means that it cannot be erased from cache 40 until a pinning flag (not shown) of directory 43 has been erased by a host 11 issued command. If the data is not pinned to cache, then at step 176 the block that was just read is made the most recently used (MRU) block in the LRU list 46 of directory 43. At step 177, nonpertinent logic steps are performed by processor 31P. Then at step 180, LDCB 62 is again accessed for examination of SEQ bit 100. If sequential data has been indicated for the addressed device 16, then processor 31P at step 182 examines the appropriate LDCB B COUNT 102 to see if the block count is equal to zero, i.e., is the just-transferred block the last block in the sequence of data. If it is not the last block to be transferred, then at step 183 the block count (BK) is decremented by one. From steps 180, 182 or 183, logic path 181 lead processor 31P back to ACE 50P for performing final status reporting to host 11 in a usual manner.

Figure 7:
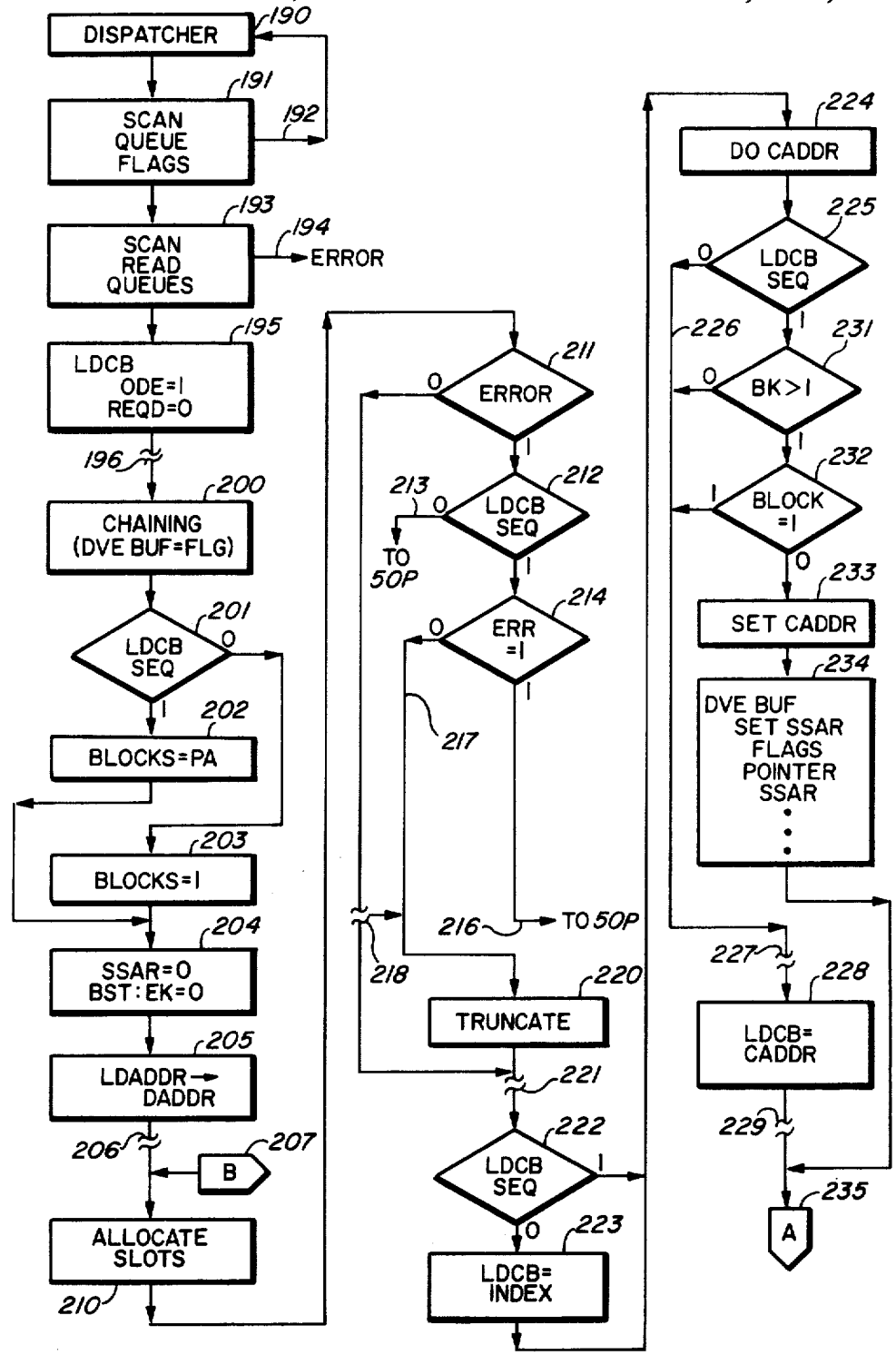
FIGS. 7 and 8 jointly show a machine-operations flow diagram related to the promotion of sequential data from a backing store to a front, or cache, store including preparatory portions and internal command word portions for the FIGS. 1 and 2 illustrated data storage system.
Figure 8:
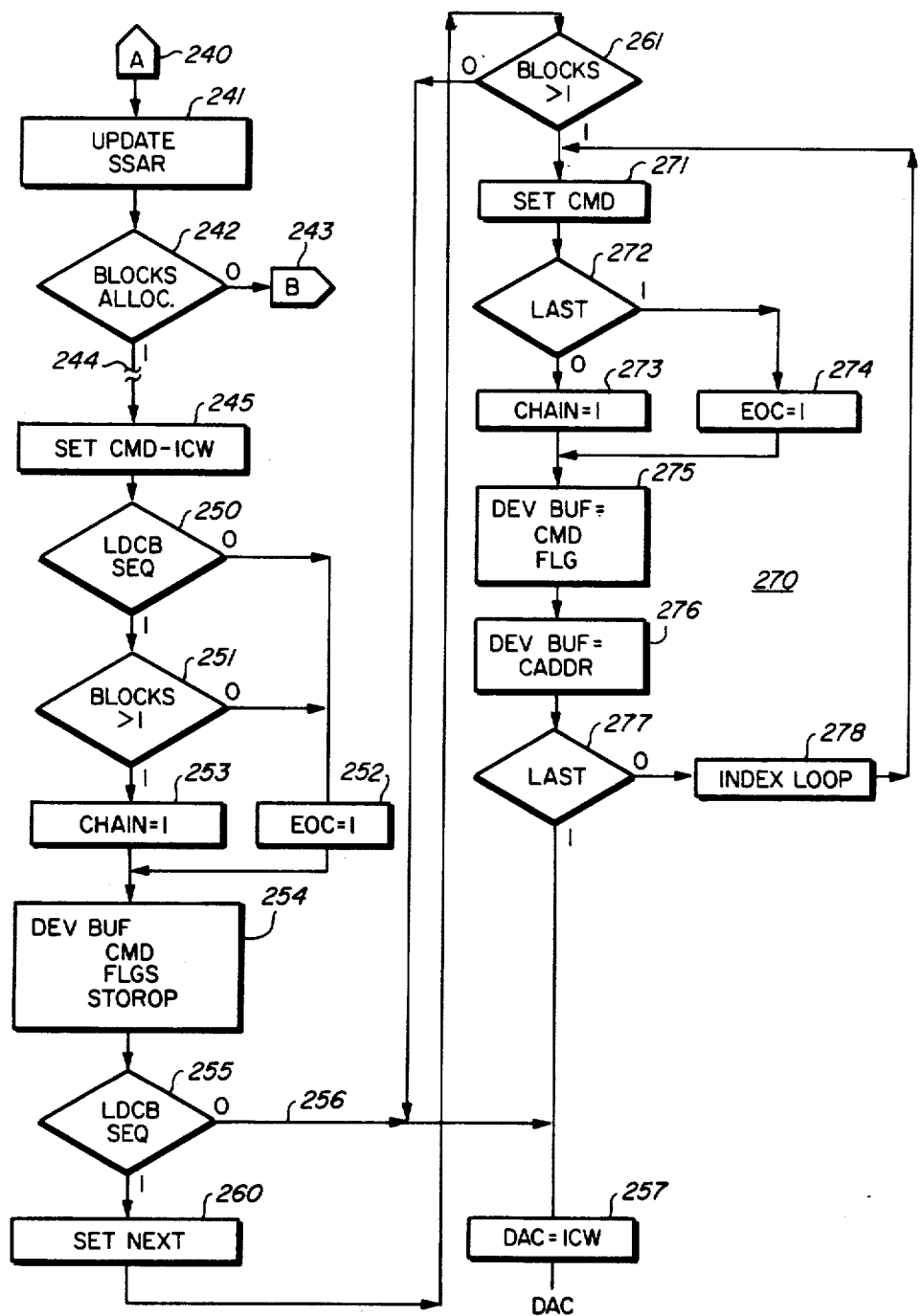

FIGS. 7 and 8 illustrate scanning the read queues in queue registers 69 and generating an ICW chain of internal data storage system 10 commands. After the requested read has been enqueued, processor 31P causes system 10 to perform diverse functions, such as responding to host 11 issued commands received over various ones of the channel adaptors 32, additional commands received from the channel adaptor 32 which had transferred the read command (which was CCR'd). When there is a lull in receipt of peripheral commands from the host 11, SEEK and SET SECTOR device commands are sent by processor 31P to devices 16. When there is a lull in control activity (which may occur while cache 40 is transferring data to host 11, receiving data from host 11, transferring or receiving data from an addressed device 16) processor 31P through its dispatcher microcode, which is a portion of OP 75 (FIG. 2), scans work tables (not shown), including queue registers 69. If the queues in queue registers 69 are empty, i.e., no reading nor writing is to occur, processor 31P follows logic path 192 returning to dispatcher 190. If a read has been enqueued as detected at step 191 by scanning the read queue flags 129, the queue entry is transferred from a queue register 69 portion 128 at step 193 to an internal register (not shown) of processor 31P. If an error occurs in this queue transfer, an error reporting and recovery technique (not described) is instituted at step 194. Upon successful reading a queue entry from a queue register 69, LDCB 62 is accessed at step 195 to set ODE section 90 to unity to indicate that a DEVICE END is owed upon completion of a successful read (such as indicated in FIG. 5 by arrow 150). At step 196 some nonpertinent functions are performed. Then at step 200, in the device buffer area 77 corresponding to the addressed device, a bit (not shown but corresponding to bit 27 of FIG. 1) is set to indicate that logical chaining will occur, i.e., more than one ICW will be used in the upcoming access to the addressed device 16. At step 201, LDCB 62 is again accessed to examine the value of SEQ bit 100. For sequential data being indicated, processor 31P proceeds to step 202 to set up the block count for the upcoming ICW chain equal to the received paging parameter (PA) in the illustrated embodiment.

A maximum number of blocks which can be transferred through a given ICW chain is equal to the number of SSARs 58. For example, for eight SSARs the number of blocks transferred will be a maximum of eight. Further, delay boundaries are a consideration, for example, if the eight blocks to be transferred require accessing two cylinders; then only those blocks in a first-accessed cylinder of DASD tracks are transferred. For example, if the eight blocks have four blocks in a first cylinder and four blocks in a second cylinder, then the number of blocks would be set to four. This action minimizes the time required to transfer a series of blocks and enables all transfers to proceed to completion at electronic speeds. In the event of a miss on the first block of a given cylinder, then up to eight blocks could be automatically transferred. Also the maximum number of blocks is never greater than the remaining value in B COUNT 102. The ICW chains are constructed such that cylinder boundaries are never crossed by any given ICW chain. These calculations follow usual computer-programming techniques and are not described further for that reason. If sequential data is not indicated at step 201, then the number of blocks to be transferred is set to one at step 203. These numbers are supplied to the device buffer 77 along with the chaining flag, device 16 address and other device control data. At step 204, the SSAR 58 identification is set to zero and EK of BST is also set to zero. This means that processor 31P will access the SSAR having identification zero.

At step 205, the logical address LDADDR received via a CCW 19 of FIG. 1 is converted to a physical device 16 address. In the illustrated embodiment, this action is achieved by merely masking the logical address to delete logical-address-indicating bits. Certain nonpertinent functions are performed at 206. Point 207 is reentry point B from a continuation of the machine-operation flow diagram described with respect to FIG. 8, i.e., all of the logic steps from 190 through 206 are preparatory steps with the following-described steps being repeatable as a loop for setting up a succession of data block transfers.

The first step 210 in the loop allocates a slot or addressable data storage space in cache 40. Usual allocation procedures are followed, i.e., an addressable unit (slot) in a so-called free list is identified as the addressable unit or slot to receive the first block of signals from the addressed device 16. That slot is then removed from free list FBL 79 and identified within an internal register (not shown) within processor 31P for identifying which directory 43 entry is to be used for identifying the slot in cache 40. Note that there is one entry register in directory 43 for each addressable slot in cache 40. Accordingly, the actual address in cache 40 of the data can be derived directly from which register of directory 43 contains the entry.

Upon the attempted allocation of the number of slots equal to the number of blocks set in steps 202 or 203, processor 31P at step 211 determines whether or not any error occurred in the allocation process. If an error has occurred, the total number of blocks may not be successfully transferred from the addressed device 16 to cache 40. Accordingly, for an error condition, at step 212 processor 31P examines LDCB 62 SEQ bit 100 to determine if the data transfer is a sequential data transfer. If it is not a sequential data transfer, processor 31P follows logic path 213, returning to ACE 50P to wait for a replacement algorithm control to make space available for one block. For a sequential data transfer, processor 31P at step 214 determines whether or not the error occurred on the first block to be transferred. If the error is in the first block, processor 31P returns via logic path 216 to ACE 50P. If the allocation error is not in the first block, then data transfers of the preceding blocks occur. Processor 31P follows path 217 to step 220 for truncating the number of blocks to be transferred in the unallocated area from the ICW list, i.e., all desired blocks beginning with the block associable with the allocation error are removed from the ICW chain.

Returning to step 211, if there were no allocation errors, then at step 218 some nonpertinent functions are performed. These functions include analyzing microcode logic errors not related to allocation. If a slot was not allocated due to such microcode errors, then the truncate step 220 is performed for reducing the number of blocks transferred from the addressed device 16 to cache 40. Without an error or after truncation, processor 31P performs some nonpertinent logic steps at step 221. At step 222, LDCB 62 SEQ 100 is examined. If SEQ bit equals zero, i.e., nonsequential data, then at step 223 the index of the directory 43 entry corresponding to the slot in cache 40 to receive the data is entered into LDCB 62 section 114 of RPARMS 83. For sequential data or after the index is entered into LDCB 62, at step 224 the cache address to be inserted later into an SSAR 58 is generated from the directory index just inserted into LDCB 62. This generation is merely adding an offset to each of the directory indices. Then at step 225, LDCB 62 SEQ bit 100 indicating sequential mode causes processor 31P to examine B COUNT 102 to see if the count is greater than one, then at step 232 processor 31P examines to see if the first data block in the sequence of blocks being transferred is now being handled. If not, at step 233 a new cache address for the second block is provided. Then at step 234, in the device buffer area 77, the SSAR 58 corresponding to the second or other blocks is set to the cache address, flags are set, pointer to the directory 43 is set and the SSAR 58 to receive the cache address is identified. Other functions to be performed may also be defined within device buffer 77.

Returning to steps 225, 231 and 232, the logic path 226 to nonpertinent steps 227 is followed by processor 31P accessing LDCB 62 to store the generated cache 40 address in section 116 of RPARMS 83. Then following nonpertinent steps 229, processor 31P proceeds through logic page connector 235 to the logic steps shown in FIG. 8.

The connection between FIGS. 7 and 8 is through connector A denominated by numerals 235 and 240, respectively, in FIGS. 7 and 8. At step 241 processor 31P updates the pointer to SSAR 58 by incrementing EK 121 of FIG. 3. At step 242, processor 31P determines whether or not all of the data blocks to be transferred to cache 40 have received space allocations in cache 40. If not, through connector B 243, processor 31P returns to FIG. 7 flow chart at B 207 to allocate a cache 40 slot for another data block. This loop is repeated until EK 121 contains a count equal to the number of blocks to be transferred (not more than eight).

After completing the above-described loop, some nonpertinent logic steps are performed at step 244. At step 245, the read command is set into the ICW representing a read data command for a device 16. At step 250, LDCB 62 is accessed to determine whether or not the sequential flag SEQ 100 in PPARMS 81 is set or reset. When set, processor 31P at step 251 determines whether or not the received block count is greater than one. If it is greater than one, then a chaining indication is set in command modifier byte 27 of ICW 24 (FIG. 1); otherwise from steps 250 or 251 the end of chain indication EOC is indicated in byte 27 by resetting that chain indicator. At step 254, the device buffer 77 in control store 73 receives the ICW, i.e., the code permutation flags and other storage operation (STOROP) indications. At step 255, processor 31P again examines SEQ bit 100 of LDCB 62 for nonsequential, i.e., SEQ=0. If a non-sequential data transfer is to occur, processor 31P follows logic path 256 to execute logic step 257 for transmitting the just-constructed ICW to DAC 56P via LKP 25.

For a sequential data transfer, processor 31P leaves step 255 to execute step 260 for adjusting EK 121 to the next entry (SET NEXT). Then at step 261, if the remaining block count is not greater than one, the ICWs 24 are transmitted to DAC 56 via LKP 25 in step 257. For a number of blocks remaining greater than one, loop 270 is executed for setting up the remaining ICWs 24 in a chain. At step 271, the command is set for READ COUNT, KEY, DATA and multitrack commands. At step 272 processor 31P determines whether or not the last block in a sequential group of blocks is to be processed. If not, the chaining flag in byte 27 of the ICW being built is set to unity. Otherwise, at step 274 the end of chaining condition is indicated by resetting the chaining flag. At step 275 the just constructed ICW 24 is transferred to device buffer 77. At step 276 the cache address CADDR is stored in device buffer 77 such that it can be transferred immediately to an SSAR 58 for the burst transfer. At step 277 processor 31P determines if the data block is the last block; if not, the loop is indexed at step 278, adjusting a count in an internal register (not shown) using usual control techniques. Otherwise, step 257 is performed. When the loop is indexed at step 278, the steps 271 through 277 are performed.

DAC 56P upon receiving the ICW chain executes the chain in the same manner that it executes received chained commands through channel adaptors 32. Since this latter operation is well known, the execution of the ICW chains is not further described. It should be noted that in transferring signals from an addressed device 16 to cache 40, DAC 56P not only provides the addressing to the device 16 but also transfers the cache address contents of device buffer 77 into SSAR 58 such that several blocks of data can be transferred in a single data stream. Upon completion of that data transfer, DAC 56P loads the resultant status, including error indications, into LKP 25. The processor 31P operation then switches from DAC 56P to CAC 61P.

Figure 9:
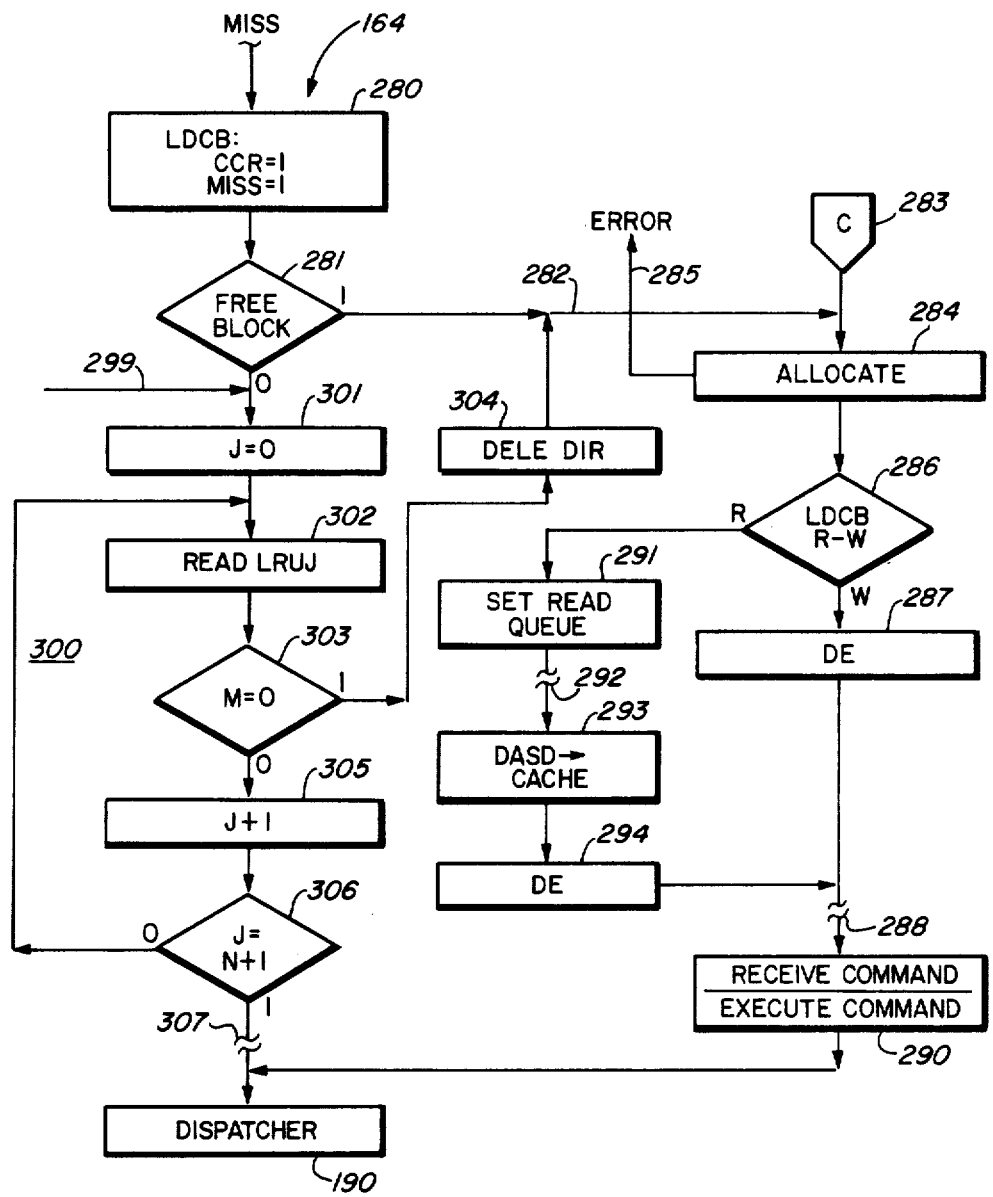
FIG. 9 is a simplified machine-operations flow chart showing machine control processing following a cache miss.

FIG. 9 shows machine operations performed via processor 31P subsequent to a cache miss. These machine operations occur in step 164 of FIG. 6 for example. At step 280, processor 31P accesses LDCB 62 for the addressed logical device for setting CCR 95 and MISS 96 fields of the found section 80 to unity. This action signifies that a channel command retry was sent to host 11 because of a cache miss. These signals will be used later as explained with respect to FIG. 11. Then at step 281 processor 31P examines FBL 79 to determine if any of the addressable data storage areas or blocks of cache 40 are free for allocation. The early cast-out of data from cache 40 to devices 16 increases the probability that some blocks will always be free. The free block list FBL preferably consists of the LRU 46, entries having M bits 47 equal to zero. By keeping the freed block identification in LRU 46, addressability of the identified data is maintained. Steps 300–307 show this operation. Upon finding a freed block, processor 31P follows logic path 282 to allocate step 284 in which a free block identification is removed from FBL 79 and the corresponding entries of directory 43 are changed from the current identification to identify the device 16 addressable storage area then being allocated to cache 40. If an error occurs during such allocation procedure, a well-known procedure, processor 31P leaves step 284 along logic path 285 to error recovery procedures beyond the scope of the present description. When a separate FBL 79 is kept, allocate step 284 can be entered subsequent to a casting out operation, as described with respect to FIG. 11, via off-page connector C 283.

Following a successful allocation of a cache 40 addressable data storage area at step 284, processor 31P at step 286 accesses the LDCB 62 for the addressed logical device, section CMD 93, to determine whether the cache miss resulted from a READ channel command or a WRITE channel command. For a WRITE channel command, a DEVICE END is forwarded to host 11 at step 287. That is, for handling a cache miss for a write command all that is required is that data storage space be allocated within cache 40 to receive the data expected from host 11. When processor 31P is sufficiently fast, a CCR for a write command miss may be dispensed with. In such an instance steps 284 and 286 functions precede step 280; then step 280 is performed only for a read cache miss search as described for step 291. For a read operation indicated at step 286, processor 31P at step 291 sets the read queue (FIG. 3) for the associated device 16. For example, for device D2, a cache miss for LDCB 2 associated with device D2 results in the illustrated entry being made in read queue 128. Following setting the read queue, processor 31P proceeds to other operations at step 292. These other operations include executing dispatcher 190 which searches for work to be done within data storage system 10. As a part of executing dispatcher 190, the read queues 128 are scanned for identifying read operations scheduled to be performed. When read queue 128 for D2 is scanned, then at step 293, processor 31P transfers the requested data blocks from a device 16 (DASD), such as device D2, to cache 40. This, of course, involves processor 31P supplying the read queue 128 information to LKP 25 to be used by DAC 56P. Once DAC 56P receives the necessary information from the ICW chain, the data is transferred from the addressed device 16 to cache 40 using known DASD read techniques. Upon completion of that read operation, processor 31P at step 294 examines the appropriate LDCB 62 for the second logical device of device D2 sections CCR 95 and MISS 96 of foundation portion 80. As a result of that examination, processor 31P realizes that the read promotion from the addressed device 16 to cache 40 resulted from a cache miss requiring a DEVICE END (DE) to be forwarded to host 11, as indicated at step 294.

The reexecution of the channel command which caused the cache miss will occur at some later time. That is, host 11 responds to the DEVICE END sent at step 287 or 294 by resubmitting the channel command. In the meantime, at step 288 data storage system 10 receives unrelated commands to perform all kinds of data storage operations as may be requested by host 11 and which are not related to the instant data transfer, as well as other asynchronous operations beyond the scope of the present description. Finally, at step 290 host 11 supplies the command a second time such that data storage system 10, in searching directory 43, will now have a cache hit occurring at step 163 of FIG. 6 resulting in the data being transferred from cache 40 to host 11. Upon completing the resubmitted command, data storage system 10 proceeds to other data operations such as via dispatcher 190.

In the event that FBL 79 identifies no blocks of cache 40 as being free or a scan of LRU 46 to AT 49 finds no entries with M bit 47 equal to zero, then some of cache 40 addressable storage areas have to be freed to permit allocation step 284 to be executed. Such freeing of addressable storage areas of cache 40 occurs not only as a result of a cache miss, but also by dispatcher 190 operations in scanning for work. For example, in accordance with predetermined priorities, beyond the scope of the present description, dispatcher 190 may cause processor 31P to follow logic path 299 to execute the following-described machine operations in loop 300 on a periodic or aperiodic basis to ensure that FBL 79 will have an entry for satisfying allocation requirements resulting from a cache miss. In such an instance when FBL 79 is not empty, then for a write command having a cache miss, the allocation step 284 can be rapidly performed for avoiding sending a channel command retry to host 11 as indicated earlier in the present description. Avoiding sending a channel command retry is a preferred mode of operating data storage system 10.

The casting out data operation in accordance with the invention not only identifies data to be moved from cache 40 to a device 16, but also groups a plurality of data blocks from diverse cache 40 addressable storage areas to be sent to a single device 16 as a group of such data blocks. When device 16 is a DASD having a plurality of cylinders of tracks accessible by a plurality of transducers through electronic switching, then all of the data blocks storable in a cylinder of tracks along with a first-identified data block are grouped for recording during a single device 16 selection. Under certain circumstances, the number of data blocks may be limited to a number less than the total number of blocks in a given cylinder of tracks. For example, when there are but eight SSARs 58, then a maximum of eight data blocks can be transferred. For a cache 40 operating sufficiently fast to handle all transfers independent of immediate availability of cache addresses, then the maximum number of data blocks in a group of data blocks to be transferred is equal to the number of blocks in a cylinder. Where the data blocks are a subset of a track (each data block stores one-fourth of a track, for example), then with eight SSAR's eight blocks are transferred—the equivalent data storage for two of the tracks within a given cylinder. Other permutations on the grouping requirements may be added within the scope and sphere of the present invention. Such grouping and writing occurs as a function of dispatcher 190 operations as described with respect to FIG. 10.

The above-described scanning and grouping takes substantial time of processor 31P operation. Accordingly, when there are no free blocks at step 281 of FIG. 9, rather than going firstly to the casting out operation, processor 31P examines LRU list 46 for identification of data blocks stored in cache 40 which are not modified. In a preferred form the LRU 46 entries having M=0 constitute a list of blocks available for allocation, i.e., "free." That is, as shown in ADEB 76 of FIG. 3, M bit 124 is zero for the LRU 46 entry. As shown in FIG. 1, the M bits 47 are examined. Then the first-encountered entry in LRU 46 below threshold AT 49 having an M bit of zero is allocated for receiving the data either from host 11 or the addressed device 16. Such scan begins at the LRU end (LRU+0) of the LRU list 46. The LRU list 46 scanning is controlled by so-called J counter 37 of control store 73 (FIG. 2). The counter is initialized at step 301 (FIG. 9) by setting it to all zeroes. With J equal to zero, the processor 31P in scanning LRU list 46 accesses the entry identifying the least recently used data block in cache 40. After initializing step 301, loop 300 controls the scan of LRU list 46. First at step 302 the Jth LRU 46 entry is read into processor 31P. This means the directory 43 entry identified in the LRU 46 list through the index field 107 is read from system storage 30 into ADEB 76. At step 303, the just-read directory 43 entry is examined for determining whether the M bit 124 is zero. If the M bit is zero, it is unmodified data, i.e., the data stored in cache 40 is identical to the corresponding data stored in the identified device 16. Then at step 304 the cache 40 addressable storage area just identified is freed for allocation by deleting the identified directory 43 entry, as well as the contents of ADEB 76. Then, scan 300 is terminated and path 282 is followed to the previously described allocate step 284. If M does not equal zero, the data in cache 40 identified by the index of LRU J is modified then processor 31P proceeds through loop 300 to index to the next least recently used entry of LRU list 46. At step 305 unity is added to the count J in register 37. At step 306 processor 31P compares the new J value with the value N+1 which is the LRU 46 entry corresponding to the entry just above availability threshold AT 49 of FIG. 1. Please note that MRU−M has the same value as LRU+(N+1). When J is less than N+1, processor 31P returns to step 302 to repeat the loop 300 until either the branch at step 303 results in an unmodified data being identified or the availability threshold AT 49 has been reached. Then at step 307 processor 31P performs some unrelated functions before returning to dispatcher 190. When dispatcher 190 is returned to from step 306, no space has been allocated within cache 40 for the data to be stored in cache 40 as a result of the cache miss, i.e., either read or write. The hoped for data transfer must now wait until data within cache 40 is destaged to a device 16, which, of course, will create some unmodified blocks resulting in allocation at 284.

When no unmodified data blocks are in cache 40 after a cache miss or during periodic dispatcher 190 initiated scanning, the operation of data storage system 10 includes scanning LRU list 46 in accordance with the invention and as shown in FIG. 10. The above-mentioned scanning for establishing free blocks to make space available in cache 40 for data to be recorded or read occurs in two major steps. The first step is to check the discard list DL 38 to see if any data can be discarded. Following that step, LRU list 46 (FIGS. 1 and 4) is scanned from the least recently used entry up to availability threshold AT 49. Any hit (modified data) in this scan results in a second scan beginning at the hit and continuing through group threshold GT 57 for establishing a group of data blocks to be recorded on a given device 16, the device for storing the modified cache 40 data identified by the hit.

When the free list is included as a part of LRU 46, examination after a cache miss omits step 281 and proceeds directly to loop 300 through step 301. Of course, logic entry at step 299 may still occur for diverse reasons.

Referring to FIG. 10, from dispatcher 190, processor 31P follows logic path 310 in the dispatcher's 190 look for work to be done. At step 311 DL 38 (FIG. 2) is examined for entries. If there are any entries in DL 38, at step 312 those entries are fetched for identifying which directory 43 entry is to be deleted at step 313 and for transferring the index value (index 107 of ADEB 76 FIG. 3) to FBL 79. These actions create free blocks for cache 40. Processor 31P then can continue to loops 316 and 330 for the LRU 46 scan or can perform step 314, which examines LDCB 62 for any logical device that has a CCR 95 and a MISS bit 96 set to unity. If such is the case, then processor 31P goes through page exit 319 labeled "C" to allocate step 284 of FIG. 9. Then steps 284 through 294 complete the data storage system's 10 action with respect to the CCR identified in the LDCB. At this time processor 31P will not clear CCR 95 since it checks the next received command to determine whether or not that command was sent as a result of a channel command retry. If at step 311 there is no entry in DL 38 or at step 314 if there is no LDCB having a CCR, then processor 31P proceeds to scan LRU control list 46. At step 315 the scan is initialized by setting the J count in J register 37 to zero. Then loop 316 is entered for scanning from the least recently used index of LRU 46 to threshold AT 49. Loop 316 comprises reading the directory 43 entry identified by the index value stored in LRU J. J equals zero on the first pass through loop 316, hence, processor 31P reads LRU or the least recently used index to examine M bit 124 at step 318. When that M bit is zero, the J count is indexed by unity at 320. Then at step 321, the value of J is compared to N+1 (the entry in LRU 46 immediately above AT 49). When J is not yet equal to N+1, loop 316 is repeated. Upon completing loop 316, logic path 337 is followed returning processor 31P to dispatcher 190. In this instance, all blocks of data identified between LRU+0 and AT 49 have no modified data. That is, the machine operations shown in FIG. 10 either have been performed a sufficient number of times or other algorithms have caused movement of all of the modified data from cache 40 represented by the entries below AT 49 to the devices 16. In this case, there is no need to move any data from cache 40 as any new allocation will find unmodified data blocks at step 303 of FIG. 9.

In FIG. 10, when M bit 124 of the directory 43 entry being examined or the M value 47 in LRU 46 (FIG. 1) is unity, then a write hit on the scan has occurred. Processor 31P then follows logic path 325 to transfer the index value of LRU J to the write queue WQ 127 for the device identified in the currently examined entry, which is in ADEB 76, i.e., the device identified in the D bit of section 108. For example, if D2 is identified in D section 108 of ADEB 76, then the corresponding write queue 127 receives the index value from section 107 (ADEB 76). At this time the flags 127F corresponding to device D2 are incremented by one. If the write queue had been empty, then the flag value would have a value of one; otherwise, the value will reflect a greater number of entries in the write queue. This index value represents a first-identified data block within cache 40 which is to be moved from cache 40 to a device 16. A hit terminates loop 316 and causes processor 31P to execute loop 330.

Processor 31P in loop 330 scans LRU control list 46 from the hit position, which for example can be LRU+1 (FIG. 1), through GT 57 or until an appropriate number of data blocks have been identified which are groupable with the first-identified data block. When devices 16 are DASDs, then groupable data blocks in cache 40 are those data blocks having a CCP value in section 108 of the corresponding directory 43 entry equal to the CCP value of the first-identified data block; of course, within the same addressed device.

The secondary scan to the secondary threshold GT 57 only occurs when a hit occurred in loop 316. It begins at step 331 by processor 31P incrementing the J count by unity. In the FIG. 1 illustration, the next LRU entry to be examined corresponds to LRU+2. Accordingly, that directory 43 entry moves to ADEB 76. Then processor 31P at step 332 examines its M bit 124. Since its value is equal to zero, processor 31P follows logic path 333 back to step 331 for repeating loop 330. If the M value 124 is nonzero, then at step 334 processor 31P examines the CCP value of ADEB 76 and the CCP value of the first-identified data block which is in write queue WQ 127. In an alternative arrangement, a work register (not shown) residing within processor 31P can contain the device address represented in section 108 of ADEB 76 (FIG. 3) such that comparison of the CCP values of the current ADEB 76 entry and the first-identified data block is facilitated. Please note that the CCP value represents the physical cylinder address on the device 16. In this manner, any virtual disk arrangements within a device 16 will not alter nor affect scanning LRU control list 46.

If the cylinder addresses' CCP are different, then logic path 333 is followed to reinstitute a next scan of loop 330. When both data blocks are in the same cylinder, processor 31P at step 335 transfers the index value of the LRU J+1 entry to write queue WQ 127 and increments the flag 127F count. Then at step 336, processor 31P examines the write queue WQ 127 to see if there are eight entries for the cylinder CCP. If there are eight entries, then a complete group of data blocks has been identified for transferring from cache 40 to a device 16 irrespective of the incompleteness of the scan in loop 330. Accordingly, dispatcher 190 then is returned to such that the write queue scans, described later with respect to FIG. 11, schedule the demotion of grouped data. If the grouping has not reached an upper limit, then at step 338, processor 31P examines the J value in register 37 to compare it with the constant MRU-K, i.e., the LRU control list 46 entry immediately above GT 57. Equality signifies completion of the secondary scan such that path 337 is followed to dispatcher 190. At this time there may be only one data block to be demoted or there may be up to seven data blocks in the illustrated embodiment. When the value J has not yet reached MRU−K, then path 333 is followed to reinstitute one more iteration of loop 330.

FIG. 11 illustrates the machine operations performed via processor 31P which scan all of the write queues 127 in looking for data stored in cache 40 to be transferred to any one of the devices 16. Machine operations are instituted from dispatcher 190 over logic path 340. At step 341 the contents of write queue counter WQK 84 are examined to determine which write queue 127 is to be examined. WQK 84 can be treated as a shift register having a number of digit positions equal to the number of devices 16. A single bit is set to unity, with the bit position indicating which write queue is to be examined. Upon completion of examination of that write queue the single one is shifted to the next digit position, enabling the next write queue to be examined. In this manner a round-robin queue examination is performed.

Loop 342 examines the write queue flag 127F to determine whether the associated write queue is empty (127F equals zero) or is nonzero for indicating one or more entries. At step 343, the queue flags 127F corresponding to the value of WQK 84 are fetched from control store 73. The queue flags are examined at step 344. If the queue flags are zero, then loop 342 is completed by incrementing (shifting) WQK 84 by one at step 345. At step 346, the shifted value is compared with the initial value fetched at step 341. If the values are equal, a scan has been completed. Then processor 31P follows path 347 returning to dispatcher 190. Otherwise, steps 343-345 are repeated. Whenever write queue flags 127 are nonzero, then processor 31P follows path 348 to examine at step 350 whether or not the identified device is busy. If the device is busy, then no work is scheduled for that device and processor 31P follows logic path 351, returning to step 346 for continuing scanning through loop 342. If the device is not busy at step 350, then at step 352 an ICW 24 chain is built using the above-described procedures. At step 353, the constructed ICW 24 chain is transferred to LKP 25 to DAC 56 for execution. Then at step 354, the actual data transfers from cache 40 to the addressed device 16 occur. At step 355 some posttransfer operations, not pertinent to an understanding of the present invention, are performed. At step 356, the corresponding M bit (47 of LRU 46 (FIG. 1)) is reset and the entry kept in the text and FBL 79 receives the index values of the cache 40 addressable data storage areas which had contained the data blocks just transferred to the addressed device 16. This prepares the data storage system 10 to allocate space in cache 40 in accordance with the FBL 79 list. At step 357, LDCB 62 is examined to see if any CCR 95 and MISS 96 bits are set to unity, i.e., a cache miss. If there was a cache miss, then at step 358 FBL 79 is read to obtain the index value of one of the just-freed addressable storage areas of cache 40. At step 359, FBL 79 is examined to see if it is empty. If it is empty, an error has occurred, i.e. the step 358 was not successfully performed. Then processor 31P follows path 360 to an error recovery procedure beyond the scope of the present description. Otherwise, processor 31P proceeds to allocation step 284 of FIG. 9 as indicated via off page connectors 361 of FIG. 11 and 283 of FIG. 9. If the write queue scanning did not occur because of a cache miss as indicated at step 357 by the CCR and MISS bits of LDCB not being unity, then at step 362 processor 31P performs some nonpertinent functions and returns to dispatcher 190. Alternatively, from step 362, processor 31P may return to loop 342 to complete scanning of the write queues 127. However, under certain design constraints, it can be more appropriate for processor 31P to employ dispatcher 190 to scan for diverse types of work to be done rather than completing all writing to devices 16 that may appear in the write queues. Other design constraints may indicate immediate return to path 351 for reinstituting an iteration of loop 342.

FIG. 12 shows the processor 31P implemented machine operation for a mode-setting command such as a SET PAGING PARAMETERS (SPP) command shown in CCW 19 of FIG. 1. The command is received through a channel adaptor 32. The command is decoded at step 365 by ACE 50 (FIG. 1). At step 366, processor 31P determines whether or not it is a mode-setting command, i.e., SPP of CCW 19. If the command is not SPP, logic path 367 is followed by processor 31P to execute a different type of received command. For a mode-setting command, at step 368 processor 31P accesses the appropriate LDCB associated with DADDR 20 of CCW 19 for setting the read and discard bit RD 101 of PPARMS 81 (FIG. 3) to the value in byte 22 as well as SEQ bits 94 and 100 of foundation 80 and PPARMS 81. Insofar as practicing the present invention is concerned, updating LDCB 62 for the addressed logical device completes the execution of the mode setting command. Other SET PAGING PARAMETERS commands may include other control parameters which will have to be updated in the control data structure of data storage system 10, preferably within control store 73. At step 369, processor 31P supplies ending status to host 11 in the usual manner. Other functions may be performed at 370 before processor 31P returns to dispatcher 190 in looking for additional work.

While the invention has been particularly shown and described with reference to preferred embodiments thereof, it will be understood by those skilled in the art that various changes in form and details may be made therein without departing from the spirit and scope of the invention.

What is claimed is:

1. In a peripheral data storage system having host connection means for connecting the data storage system to a host processor and having a cache and a backing store, means for transferring data signals between said cache store and said backing store, said cache and backing store each having a plurality of addressable data storage areas for storing data, directory means connected to the cache store for enabling the addressing of the cache store areas using backing store addresses; the improvement comprising:

first means for maintaining a control list having an entry for each allocated one of said addressable data storage areas in said cache storing data allocated from said backing store, each said entry including a first indicator indicating that data stored in said area associated with said entry has been modified from the corresponding data stored in said backing store, and a second indicator, indicating a relationship of data stored in said area associated with said entry to other data stored in said cache;

first scan means coupled to said first means for scanning a first portion of said control list to identify a first one of said addressable data storage areas in said cache store storing modified data;

second scan means coupled to said first means and to said first scan means for scanning said control list from said first one of said addressable data storage areas in said first portion of said control list through a second portion of said control list to identify further ones of said addressable data storage areas in said cache having a predetermined relationship to data stored in said first one of said addressable data storage areas; and means coupled to said means for transferring data signals between said cache and said backing store and to said first and second scan means to link addressable data storage areas in cache identified as having said predetermined relationship as data to be transferred as a group of data blocks from said cache to said backing store.

2. The system according to claim 1 wherein said backing store includes a plurality of data-storage areas each constituting a cylinder of addressable data-storage registers, and further including means limiting said second scan means to identifying only said allocated cache-store addressable data-storage areas that are associable within the cylinder containing said first-identified one addressable data storage area.

3. The system according to claim 2, further including: said second scan means further having means for receiving peripheral commands from said host connection means for addressing said backing store addressable data-storage registers; said peripheral commands indicating an addressed register; and logical device means coupled to said transferring means for storing said peripheral commands and for identifying a cylinder of said backing store containing said addressed registers.

4. The system according to claim 1, further including: second list means for identifying addressable data-storage areas in said cache store that are storing data discarded from the cache store and to be coupled to said means for linking, third scan means for scanning said second list means prior to said first and second scan means scanning said first list means such that said cache-store addressable data-storage areas identified in said second list means are available for allocation prior to the cache-store addressable data-storage areas of said cache store that are identified in said first means; and said means for linking including means for freeing said cache-store addressable data-storage areas for allocation without transferring any data from said cache store to said backing store.

5. The peripheral data storage system set forth in claim 1 or 4, further including:

cache control means coupled to said cache store and to said host connection means for receiving requests for data access from a connected host processor via said host connection means, the cache control means including a directory means, said control list means and a directory inquiring means connected to said directory means for determining if a given received request for data access relates to an allocated addressable data-storage area in said cache store for evaluating a cache hit for enabling access to said cache store for completing a data access requested by said received data-access request and when received request for data access does not relate to allocated addressable data-storage area in the cache store for indicating a cache miss;

means coupled to said host connection means and to said cache control means for reporting said indicated cache miss to said host connection means as a request to retry said received request for data access and having logical-device means indicating said indicated cache miss and logical association with said received request for data access and including means for initiating scanning said first list means for identifying a one of said addressable data-storage areas in said cache store as being available for allocation; and means in said cache control means responsive to said indicated cache miss in said logical-device means into a free indicated one of said addressable data-storage areas in said cache store to allocate said free addressable data-storage area to said received data request and signalling said host connection means that said given received data access request can be retried.

6. The machine-implemented method of managing data storage space allocations for a cache having a plurality of data storage spaces attached to a host and to a backing store having a plurality of addressable data storage elements, a directory of said data storage spaces for indicating said space allocations with respect to addresses of said data storage elements and whether or not such allocated data storage spaces respectably are storing data which is modified from data stored in related ones of said data storage elements, control list means for indicating and listing accesses to said data storage elements in an order of priority for replacement of data stored in said cache data storage spaces in accordance to predetermined usage characteristics of said stored data;

comprising the steps of:

establishing a first threshold in said control list means representing a first predetermined number of data storage space allocations listed in said control list means for replacement from a data storage space indicated in said control list means as the data storage space containing data most likely to be replaced;

establishing a second threshold in said control list means representing a second predetermined number of indicated data storage space allocations listed in said control list means, said second predetermined number being larger than said first predetermined number;

scanning said control list means beginning at said given most likely to be replaced indicated data storage space and proceeding towards that established first threshold;

identifying during said scan a data storage space storing modified data; said modified data having predetermined data storage characteristics;

listing data storage spaces identified as storing modified data with a first encountered one of said indicated data storage spaces during said scan of data storage space, storing modified data defined as a first identified one of said data storage spaces;

continuing said scan from said first identified one of said spaces storing nodified data to said second threshold for further identifying additional ones of said data storage spaces storing nodified data having said predetermined data storage characteristics;

adding said additional ones of said indicated data storage spaces to said list; and transferring data stored in said data storage spaces in said list from said cache to said backing store as a serial stream of data.

7. The machine implemented method set forth in claim 6, further including the steps of:

maintaining a second list in said control list means of data storage spaces storing data which meets predetermined criteria for removal from said cache; and adjusting said control list means by deleting identification of said data-storage spaces storing data to be discarded from said control list means before scanning said control list means.

8. The machine-implemented method set forth in claim 6 or 7, further including maintaining a free list of free data-storage spaces which are immediately available for allocation to receive data; and examining said free list and initiating freeing ones of said data-storage spaces when the number of entries in said free list are less than a given number.

9. The machine-implemented method set forth in claim 6 or 7, further including the machine-executable steps of:

receiving from said host a request for a data access;

examining said directory to determine if a data-storage space allocation is made in said cache that relates to said received request for data access, if said directory indicates a space is allocated then performing the data access, otherwise initiating a request for allocation of a data-storage space allocation; and establishing a free list of said spaces indicating which of said spaces are immediately available for allocation in response to said request for allocation, then first examining said free list and allocating any data-storage space identified on said free list for said received request for data access, otherwise initiating freeing a one of said data-storage spaces.

10. A peripheral data-storage system having a plurality of addressable direct-access data-storage devices (DASD), each of said DASDs having a plurality of addressable cylinders wherein each cylinder has a plurality of addressable data-storing memory segments, high-speed buffer store having a plurality of buffer segments, each said buffer segment having a data-storing capacity equal to the data-storing capacity of said memory segments, connection means for attaching the system to a host;

the improvement including in combination:

receiving means for receiving peripheral commands from host connection means for fetching data from said DASDs;

a digital processor connected to said connection means and to said receiving means and having a control store for storing programs of instructions for operating the data-storage system;

signal means connected to said connection means, digital processor, said DASDs and said buffer for transferring signals between said DASDs, said buffer and said host connection means;

first program means in said control store for enabling said processor to operate the storage system to transfer one segment of data from said DASDs to said high-speed buffer store in response to a one of said received peripheral commands;

second program means in said control store for enabling said processor via said first program means to maintain a control list of said buffer segments in an order reflecting host connection means accesses to data stored in the respective buffer segments and to maintain a list of said buffer segments free for allocation for data storage; and third program means in said control store for enabling said processor to first scan said control list for data stored in one of said buffer segments to be transferred from said buffer store to one of said DASDs and secondly to scan said control list for additional data stored in said buffer store having a predetermined DASD address relationship to said one buffer segment DASD address for grouping said one buffer segment DASD address and additional data for transfer to one of said DASDs under control of said first program means and including means to activate said first program means upon completion of said second scan wherein said third program means is coupled to said second program means to transfer identification signals for said one and additional buffer store segments from said control list to said free list.

11. The peripheral storage system set forth in claim 10 wherein each of said DASDs has a plurality of cylinders of record tracks, all record tracks in each cylinder having a given radial address, respectively, each of said memory segments being in respective ones of said record tracks, further including:

fourth program means in said control store for enabling the processor to operate the storage system to limit said one buffer segment DASD address and additional data stored in said buffer store to that data storable in a given cylinder of one of said DASDs.

12. A hierarchical data-storage system having connection means for connecting the data-storage system to a host processor, the system including a high-speed data cache and a relatively slow-speed backing store, data-transfer paths coupled to said cache and backing store for transferring data between addressable storage locations in said data cache and said backing store, cache replacement control means coupled to said data-transfer paths and said cache for being responsive to the contents of the storage locations in said cache to select particular items of data for replacement in accordance with predetermined replacement criteria, and data-transfer control means coupled to said data-transfer paths and said backing store for identifying locations in said backing store to receive data items so selected;

characterized in that:

said data-transfer control means grouping said selected data items with that data accessable through one of said data-transfer paths and to activating such data-transfer paths on a group-by-group basis, each group consisting of data items whose transfer involves the one said data-transfer path.

13. A system according to claim 12 wherein said backing store includes a plurality of cylinders each cylinder including one or more storage registers, wherein read or write access to registers in different ones of said cylinders is subject to access delays, each of said cylinders being in a different one of said data-transfer paths.

14. A system as claimed in claim 12 in which said backing store comprises a plurality of addressable direct-access magnetic disk data-storage devices, each device having a plurality of addressable data-storing cylinders and each cylinder having a plurality of said addressable memory segments, said cache comprises a high-speed buffer store having a plurality of said buffer segments constituting said cache storage locations, each buffer segment having a data-storing capacity equal to the data-storing capacity of said memory segments, further characterized by a command register for receiving peripheral commands from said host connection means to fetch data from said data-storage devices; a digital processor having a control store for storing programs of instructions for operating the storage system; first program means in said control store for enabling said digital processor to operate the storage system to transfer one segment of data from said backing store to said cache for each of said requests for a segment of data received from said host connection means; second program means activated via said first program means and stored in said control store for enabling said digital processor to maintain a control list of identifications of said buffer segments in an order reflecting host connection means accesses to data stored in the respective buffer segments and to maintain a list of identifications of said buffer segments free for allocation for receiving data for storage; third program means in said control store for enabling said processor to first scan said control list for data stored in a one of said buffer store segments to be transferred from said buffer store to a one of said storage devices and secondly to scan said control list for additional data stored in said buffer store having an identification located in a predetermined position in said control list with respect to said one buffer store segment identification in the control list for grouping said one and additional data for transfer to one of said storage devices under control of said first program means and including means for enabling the processor to activate said first program means upon completion of said second scan and coupled to said second program means to transfer said identifications for said one and additional buffer store segments from said control list to said free list.

15. A system as claimed in claim 14 wherein each of said data-storage devices has a plurality records tracks, all record tracks in each cylinder having a same radial address, further characterized by fourth program means in said control store for enabling the processor to operate the storage system to limit data stored in said buffer store to that data storable in a given cylinder of one of said storage devices.

* * * * *